(12) United States Patent
Okuno et al.

(10) Patent No.: US 8,798,051 B2
(45) Date of Patent: Aug. 5, 2014

(54) INFORMATION AND COMMUNICATION PROCESSING SYSTEM, METHOD, AND NETWORK NODE

(75) Inventors: Michitaka Okuno, Kokubunji (JP); Shinji Nishimura, Tokyo (JP); Hidetaka Aoki, Tokyo (JP); Yuji Tsushima, Hachioji (JP); Takeki Yazaki, Kawasaki (JP); Yuji Ogata, Saitama (JP)

(73) Assignee: Hitachi, Ltd., Tokyo (JP)

( * ) Notice: Subject to any disclaimer, the term of this patent is extended or adjusted under 35 U.S.C. 154(b) by 151 days.

(21) Appl. No.: 13/579,443

(22) PCT Filed: Feb. 18, 2010

(86) PCT No.: PCT/JP2010/001037
§ 371 (c)(1),
(2), (4) Date: Aug. 16, 2012

(87) PCT Pub. No.: WO2011/101902
PCT Pub. Date: Aug. 25, 2011

(65) Prior Publication Data
US 2012/0314608 A1 Dec. 13, 2012

(51) Int. Cl.
*H04L 12/28* (2006.01)
*H04L 12/26* (2006.01)

(52) U.S. Cl.
USPC ........... 370/389; 370/259; 340/500; 709/202; 709/224

(58) Field of Classification Search
USPC ................ 370/235, 237, 252, 259, 389, 477; 709/202, 223, 224; 455/67.11; 340/500
See application file for complete search history.

(56) References Cited

U.S. PATENT DOCUMENTS

| 5,440,547 | A | 8/1995 | Easki et al. |
| 7,904,550 | B2* | 3/2011 | Sakamoto et al. ............ 709/224 |
| 8,495,181 | B2* | 7/2013 | Venkatraman et al. ....... 709/220 |
| 2009/0041035 | A1 | 2/2009 | Matsuo et al. |
| 2009/0109985 | A1* | 4/2009 | Yazaki et al. ................. 370/401 |

(Continued)

FOREIGN PATENT DOCUMENTS

JP 06-318951 A 11/1994
JP 09-062624 A 3/1997

(Continued)

OTHER PUBLICATIONS

Wakayama et al., "Shakai Innovation o Hiraku Network Bun'ya no Sentan Kenkyu", [online], Hitachi Hyoron, 2009 Nen 11 Gatsu, Hitachi, Ltd., pp. 54-57, [retrieval date Mar. 24, 2010], Internet <URL:http://www.hitachihyoron.com/2009/11/pdf/11a10.pdf>.

(Continued)

*Primary Examiner* — Ahmed Elallam
(74) *Attorney, Agent, or Firm* — Mattingly & Malur, PC

(57) ABSTRACT

In a distributed information communication processing system in which a plurality of information communication devices provides a service through a network, response speed, electric power consumption, and further reliability are improved. The distributed information communication processing system which provides various services is configured by associating an entrance node (EN) which executes filtering near sensors, actuators, and terminals being information sources, an intelligent node (IN) which changes an information processing position and executes information processing and communication processing instead of a data center (DC), and a management node (MN) which manages these nodes. Thereby, real time type information processing can be realized.

14 Claims, 19 Drawing Sheets

(56) References Cited

U.S. PATENT DOCUMENTS

| | | | |
|---|---|---|---|
| 2009/0271529 A1* | 10/2009 | Kashiyama et al. | 710/1 |
| 2011/0202658 A1 | 8/2011 | Okuno et al. | |
| 2011/0289133 A1 | 11/2011 | Shikano et al. | |
| 2014/0016465 A1* | 1/2014 | Karunakaran et al. | 370/235 |

FOREIGN PATENT DOCUMENTS

| | | | |
|---|---|---|---|
| JP | 2002-520735 A | 7/2002 | |
| JP | 2002-312312 A | 10/2002 | |
| JP | 2005-215996 A | 8/2005 | |
| JP | 2005-301850 A | 10/2005 | |
| JP | 2004-355377 A | 12/2006 | |
| JP | 2007-274187 A | 10/2007 | |
| JP | 2001-170411 A | 9/2011 | |
| JP | 2011-193106 A | 9/2011 | |
| WO | 00/04458 A1 | 1/2000 | |

OTHER PUBLICATIONS

Nishizawa, "Tairyo no Jissekai Data kara 'Ima' o Bunseki suru Stream Data Shori no Kanosei Cosminexus", [online], Aug. 18, 2008, Hitachi, Ltd., [retrieval date Mar. 24, 2010], Internet<URL:http://www.hitachi.co.jp/prod/comp/soft1/events/report/omw_200811cosmi/pdf/cc-2.pdf>.

European Search Report received in European Application No. 10846045.2 dated Jul. 2, 2013.

Japanese Office Action received in Japanese Application No. 2012-500385 dated Sep. 24, 2013.

* cited by examiner

FIG. 10

507 search key 1001 | result # 1002

| DIP | SIP | Protocol | DP | SP | SessionID | flow |
|---|---|---|---|---|---|---|
| IP D | IP Sa | TCP | DPa | SPa | -- | flow#0 |
| IP D | IP Sb | TCP | DPb | SPb | JKL | flow#1 |
| IP D | IP Sc | TCP | DPa | SPc | -- | flow#2 |
| IP D | IP Sd | TCP | DPa | SPd | XYZ | flow#3 |
| ... | ... | ... | ... | ... | ... | ... |

| 1101 | 1102 | 1103 | 1104 | 1105 |
|---|---|---|---|---|
| flow | status | next hop | interface | new destination |
| flow#0 | OPENING | IP A | eth1 | -- |
| flow#1 | ESTABLISHED | IP A | eth1 | -- |
| flow#2 | CLOSING | IP A | eth1 | -- |
| flow#3 | NOT CONNECTED | IP A | eth1 | IP D |
| ... | ... | ... | ... | ... |

| TARGET | ARITHMETIC 1211 | FILTER 1212 | AGGREGATION 1213 | STORAGE 1214 | DESTINATION 1215 | SECONDLY DESTINATION 1216 |
|---|---|---|---|---|---|---|
| SENSOR #A | ARITHMETIC #A | FILTER #A | AGGREGATION #A | STORAGE #A | IP1 | IP2 |
| ... | ... | ... | ... | ... | ... | ... |
| SENSOR #N | ARITHMETIC #N | FILTER #N | AGGREGATION #N | STORAGE #N | IN#1 | IN#2 |
| TERMINAL #A | none | none | none | none | IP1 | IP2 |
| ... | ... | ... | ... | ... | ... | ... |
| TERMINAL #N | none | none | none | none | IP1 | IP2 |

1210, 1221A, 1221N, 1222A, 1222N

1230

| TARGET | FEEDBACK COMMAND 1231 |
|---|---|
| ACTUATOR #A | COMMAND #A |
| ... | ... |
| ACTUATOR #N | COMMAND #N |

1241A, 1241N

INFORMATION AND COMMUNICATION PROCESSING SYSTEM, METHOD, AND NETWORK NODE

CROSS-REFERENCE TO RELATED APPLICATION

This application is related to U.S. application Ser. No. 13/344,214 filed on Jan. 5, 2012 and U.S. application Ser. No. 13/435,537 filed on Mar. 30, 2012, the disclosure of which is hereby incorporated by reference.

TECHNICAL FIELD

Technologies disclosed by this specification and drawings relates to an information processing system, and particularly relates to a distributed information communication processing technology in which a plurality of information communication devices provide services through a network.

BACKGROUND ART

Recently, stream from possession to use of information processing devices is accelerated by the rise of cloud computing. The cloud computing is an information processing form which, without regard to physical configurations and locations of information and communication technology (ICT) devices such as servers and storages located in data centers or the like, uses services provided by these ICT devices through a network. A cloud system using such cloud computing has an advantage of flexible and rapid establishment of the system and reduction in the operational cost compared to a conventional ICT system.

Patent Literature 1 describes a configuration in which, when a user explicitly requests application execution processing to an information processing device such as a local server, a packet is sent to the information processing device such as a data center or the like and execution processing is requested if the aforementioned application does not exist in the local server. Patent Literature 2 discloses a system in which a destination address is assigned by the Domain Name System (DNS) so as to respond an address of a near site depending on an area of a source of an information processing request and a requestor of the information processing refers to an appropriate site in a situation that a great number of sites distributedly located around the world exist.

CITATION LIST

Patent Literature

Patent Literature 1: Japanese Unexamined Patent Application Publication No. 2002-312312
Patent Literature 2: Japanese Unexamined Patent Application Publication (Translation of PCT Application) No. 2002-520735

SUMMARY OF INVENTION

Technical Problem

In the conventional cloud system described above, information processing functions have been provided by a data center which generally aggregated and located in remote areas, and cost reduction of IT services has been realized by equipment aggregation and operation rate increase using virtualization technologies and the like. However, an architecture in which the information processing functions are aggregated in the data center in the remote area to the information source has the following three problems when the architecture is applied to applications requesting a real time property in IT business and social infrastructure applications such as electronic money, traffic control, plant control, smart grid, large-scale monitoring, and the like.

The first problem is response speed. In the application which needs the real time property, the response speed which is not in second-order but in millisecond-order is required. Even when a high quality network is used, a round-trip delay time of about 130 ms between Japan and the United Statuses or about 25 ms between long-distance cities even in Japan may be generated as communication delay. In a best effort network, more than double delay may be generated. When information processing time is added to the delay, the response speed in millisecond-order which is requested for the social infrastructure application cannot be satisfied.

The second problem is electric power saving. Communication traffic is increased by sending a lot of data to the data center located in the remote area and electric power consumption of the network is also increased. From the viewpoint of reduction in environmental load and the like, the electric power saving is the unavoidable problem.

The third problem is reliability. For the social infrastructure application, guarantee type reliability which provides fault recovery in millisecond-order and delay time assurance is required. This is not satisfied when the conventional best effort type network is premised.

An object of the present invention is to provide a distributed information communication processing system, a method, and a network node which can solve the above-described problems of the response speed of the application and the electric power saving, and the like.

Solution to Problem

In order to achieve the object, a first aspect of the present invention is an information communication processing system in which an information processing device which can execute an application and a plurality of terminals requesting services are located, the system comprising: a first network node connected to the terminals; a second network node connected to the first network node though a first network and connected to the information processing device through a second network; and a management node for managing the first network node and the second network node. The first network node sends a packet which has a destination to the information processing device through the second network node. The second network node changes destination of the packet to a processor when the packets are received and when the second network node has the processor which can perform processes for the packets, and sends the packets including the processed result by the processor to the first network node. The information processing device executes the application when the packets are received through the second network node. Another aspect of the present invention provides an information communication processing method for providing a service to a plurality of terminals, the method comprising the steps of: connecting a first network node connected to the terminal to a second network node through a first network; connecting the second network node to an information processing device through a second network; and for providing the service to the terminals, sending a packet which has a destination to the information processing device to the first network by using information obtained from the terminal in the first network node; outputting the packet to an information processing function unit which the second network node has or a node other than the second network node based on a destination and information included in the packet by the second network node when second network node receives the packet from the first network; sending a packet including a processing result to the packet processed by the information processing function unit to the first network node by the second network node; and receiving the packets including the processed result by the first network node to provide the service to the terminal.

Further, another aspect provides a network node sending and receiving a packet through a first network and a second network, the network node is constituted by a network interface unit sending and receiving a packet through an information processing node to which a plurality of terminals requesting a service are connected and a first network, and sending and receiving the packet through an information processing device and a second network; a communication control unit in which the packet being received by the network interface unit is inputted and the inputted packet is transferred to any destinations; and an information processing function unit in which any applications for the packets being received by the network interface unit are executed; in which the communication control unit can transfer the packets to any destinations by changing the destination of the packets.

Advantageous Effects of Invention

According to the aspects of the present invention, the information communication processing system which can obtain the response speed in millisecond-order which is requested from the social infrastructure application and can achieve the electric power saving can be realized. In addition, the guarantee type reliability which is required for the social infrastructure application and provides the fault recovery in millisecond-order and the delay time assurance can be obtained.

BRIEF DESCRIPTION OF DRAWINGS

FIG. 10 is a diagram illustrating one example of a flow table stored in a communication control unit in the IN according to the first embodiment;

FIG. 11 is a diagram illustrating one example of a flow status table stored in the communication control unit in the IN according to the first embodiment;

FIG. 12 is a diagram illustrating one example of an EN management table stored in a memory unit in the EN according to the first embodiment;

DESCRIPTION OF EMBODIMENTS

Hereinafter, one embodiment of the distributed information communication processing system of the present invention is described according to the drawings. In a preferred embodiment of the distributed information communication processing system of the present invention, information processing is performed near the information source as much as possible. The information processing is classified into accumulated information processing and real time type information processing. The accumulated information processing uses a data center and covers data storage and Knowledge as a Service (KaaS) which generates high value-added information and knowledge from stored data. On the other hand, the real time type information processing uses an information processing function loaded network node which is distributedly located over a network and solves the problems of the response speed, the electric power saving, and the reliability by locally performing distributed information processing with selecting data which should be processed on the network node near the information source. In other words, one embodiment of the present invention is an information communication processing system having configuration for performing distributed information communication processing in collaboration with a first network node, a second network node, and an information processing device, and providing the service to the terminals.

First Embodiment

Figure 1:
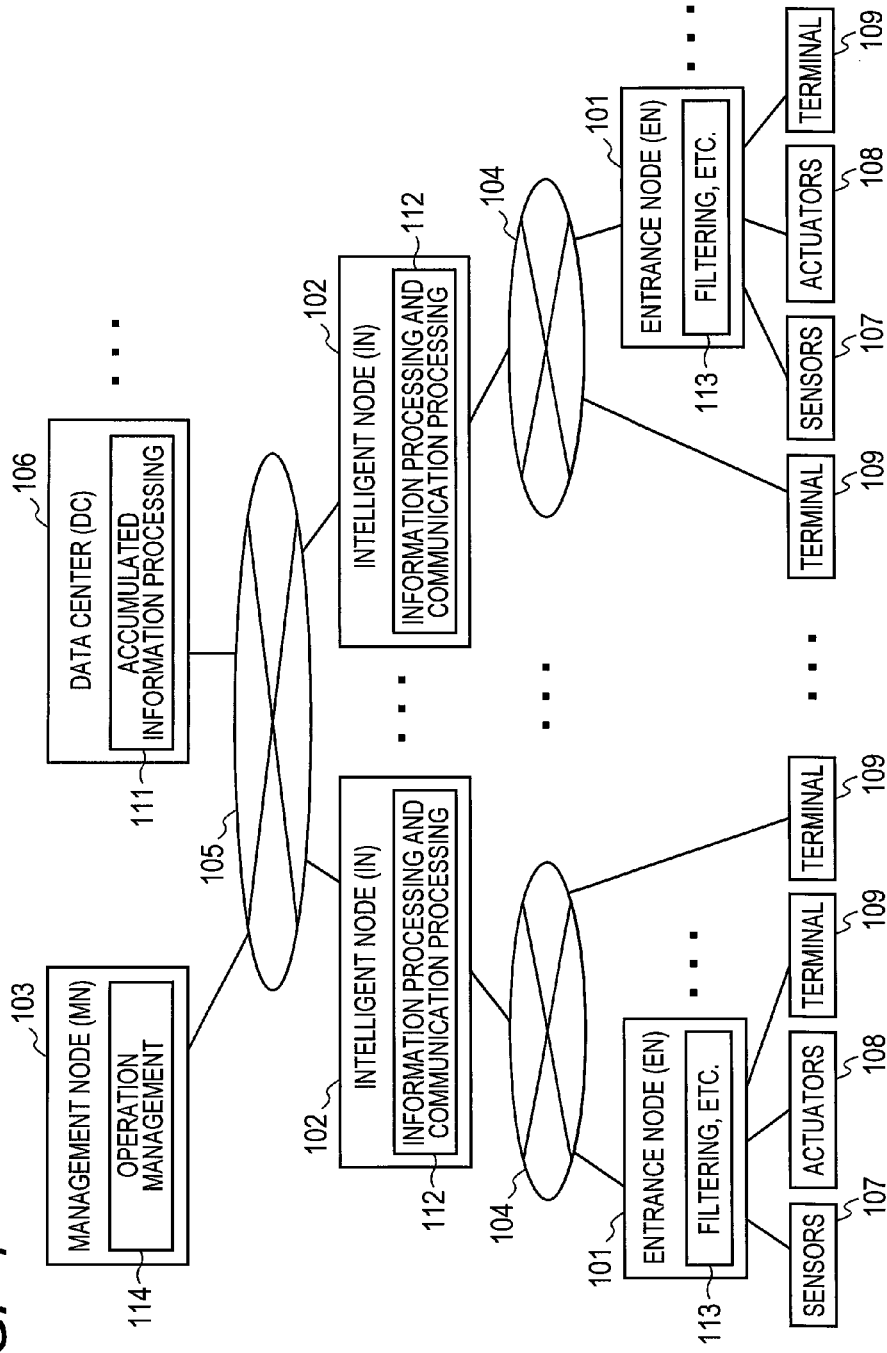
FIG. 1 is a configuration diagram of a distributed information communication processing system of a first embodiment.

One configuration example of the distributed information communication processing system according to the first embodiment is illustrated in FIG. 1. The configuration example is as follows. In the diagram, an Entrance Node (EN) 101, which is a first network node, performing primary processing, and an Intelligent Node (IN) 102, which is a secondary node, performing more advanced secondary processing are distributedly located as network nodes connected to a network 104 such as Local Area Network (LAN) being a first network for real time type information processing near the information source such as an information terminal 109 and a monitoring cameras 107. For example, the EN 101 covers filtering 113 which aggregates information from the information sources 107, 108, 109 as primary processing, while the IN 102 covers information processing 112 which performs real time type information processing. A Data Center (DC) 106 covering the accumulated information processing 111 is connected to the IN 102 through a network 105 being a second network, such as a Wide Area Network (WAN) and these are controlled by a Management Node (MN) 103.

The EN 101 can have various locations such as a gateway in LAN, and the IN 102 also can have various locations such as inside of LAN, between LAN and WAN, and inside of WAN. Hereinafter each role of the EN 101, the IN 102, and the MN 106 which is characteristics of the distributed information communication processing system of this embodiment is described. It goes without saying that the first and second networks are not limited to LAN and WAN described above.

First, the EN 101 is described. The EN 101 includes monitoring cameras and sensors 107 which collect information, an actuator 108 which is a control target, and the like. The EN 101 performs relatively simple calculation processing, filtering, and an aggregation function as described later in detail as a primary processing to the sensing data, aggregates information, and transfer the information to the IN 102. By these operations, an amount of useless data sent to the network is reduced and the electric power saving can be realized.

In addition, the EN 101 generates control signals for control target devices such as the actuator 108 by receiving feedback information from the DC 106 and the IN 102, executes processing from higher priority processing according to the predetermined order, and realizes control having high response speed.

The IN 102 includes a plurality of ENs 101, information terminals 109, and the like through the network 104. The IN 102 performs not only communication processing which transfers a packet received from the EN 101 and the terminals, but also information processing to the aforementioned packet. Specifically, the IN 102 inspects the packets from these devices, determines whether an information processing execution position is inside of the self-IN, other IN, or the DC, and transfers the packet to the aforementioned destination. When the information processing position is the self-IN, the IN 102 performs information processing and feedback information generation as second processing to the processing request instead of the DC 106, and respond the result to the ENs 101 and the terminals 109. By these processes, the communication delay is reduced and the response speed is improved. The desired response speed and the electric power saving are satisfied at any given time by dynamically changing this information processing execution position according to a direction from the MN 103. The response speed of the information processing itself is also improved by previously registering a routine processing content into the system in order to increase the application execution itself, and providing flow-based information processing which rapidly calculates difference arithmetic between arrived data and data registered in an area on a memory in a nearest certain fixed period of time, and execution platform such as hardware formation for the routine processing and a cache for a database.

When the MN 103 receives a registration request from a user who hopes to enjoy information processing service according to this system, the MN 103 assigns the IN 102 and the EN 101 which is suited for service request condition to the user based on the information, such as an IP address, which specifies the network position of the user. Consequently, the MN 103 collects performance information and position information of the IN 102 and the EN 101, and performs operation management such as allocation of the application and set of resources in consideration of response speed, reliability, and electric power saving, and setting of the information processing position. In addition, the MN 103 monitors communication delay and processing delay of the application, analyzes bottleneck of the distributed information communication processing system, and uses the result for change in a dynamic information processing position and resetting a communication pathway.

Subsequently, one example of detailed configuration of the EN 101 is described using FIG. 2 and FIG. 3.

Figure 2:
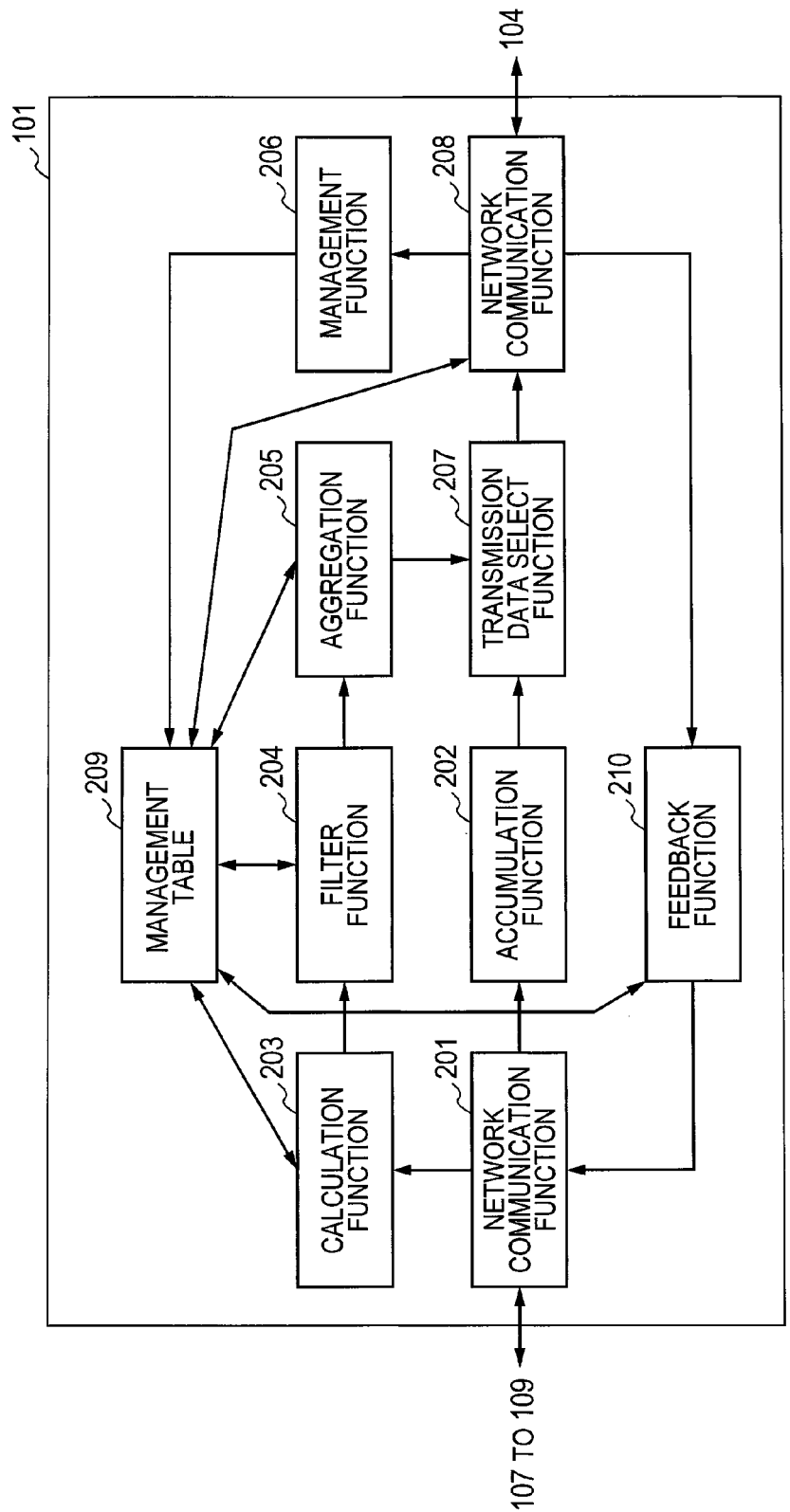
FIG. 2 is a diagram illustrating one example of function configuration of an entrance node (EN) according to the first embodiment.

FIG. 2 is a function block diagram illustrating a function which the EN 101 of this embodiment executes. The EN 101 receives and sends sensing information, camera image data, and control signals from and to the sensors 107, the actuators 108, and the terminals 109 illustrated in FIG. 1 through a network communication function 201. The data received through the network communication function 201 are stored by an accumulation function 202. Under the management of a management table 209 and a management function 206, sending data sending to an upper network is sequentially selected from data which are obtained by performing desired arithmetic and filter/aggregation processing to the received data and the stored data or the stored data itself by a transmission data select function 207. Reference signs 203, 204, and 205 represent a calculation function, a filter function, and an aggregation function, respectively.

These calculation function 203, filter function 204, and aggregation function 205 have reversible processing such as compression processing of header information of packets, and irreversible processing such as quantization processing of the sensing information which is sensor output from the sensors 107. Contents of the filter function 204 have two cases. One case is a content which is read as a filtering processing library made in the EN 101 and the other case is a content which is delivered as a program from the IN 102, the MN 103, or the like.

Examples of reversible processing include processing of difference arithmetic from a standard value of the sensing information generated by the sensors 107, packet generation processing in which a plurality of pieces of sensing information are collected, and compression processing of header information compliant with a defined communication protocol (for example, defined in RFC 4944 of IETF standard). On the other hand, examples of irreversible processing include destruction processing of unnecessary sensing information, average value calculation processing, maximum value/minimum value detection and determination processing of the sensing information, abnormal value determination processing, sampling thinning processing in a time direction, quantization processing, frame thinning processing of camera image information, image size change processing, and feature extraction processing such as face detection and motion detection. When accuracy of the sensing information is deteriorated and meaning of the information is changed by performing the irreversible processing, by buffering data before processing into a memory unit of the EN 101 by the accumulation function 202, the data before processing can be confirmed later by accessing the EN 101 from the IN 102, the MN 103, or the DC 106, which are upper nodes, if necessary.

A network communication function 208 configures an interface unit to the network 104 such as LAN illustrated in FIG. 1. The aggregated data are sent to the upper network from this. The network communication function 208 also has functions which receive control signals and the like from the upper network, and feed-back the control signals and the like to the actuators 108 through a feedback function 210 and the network function 201.

Figure 3:
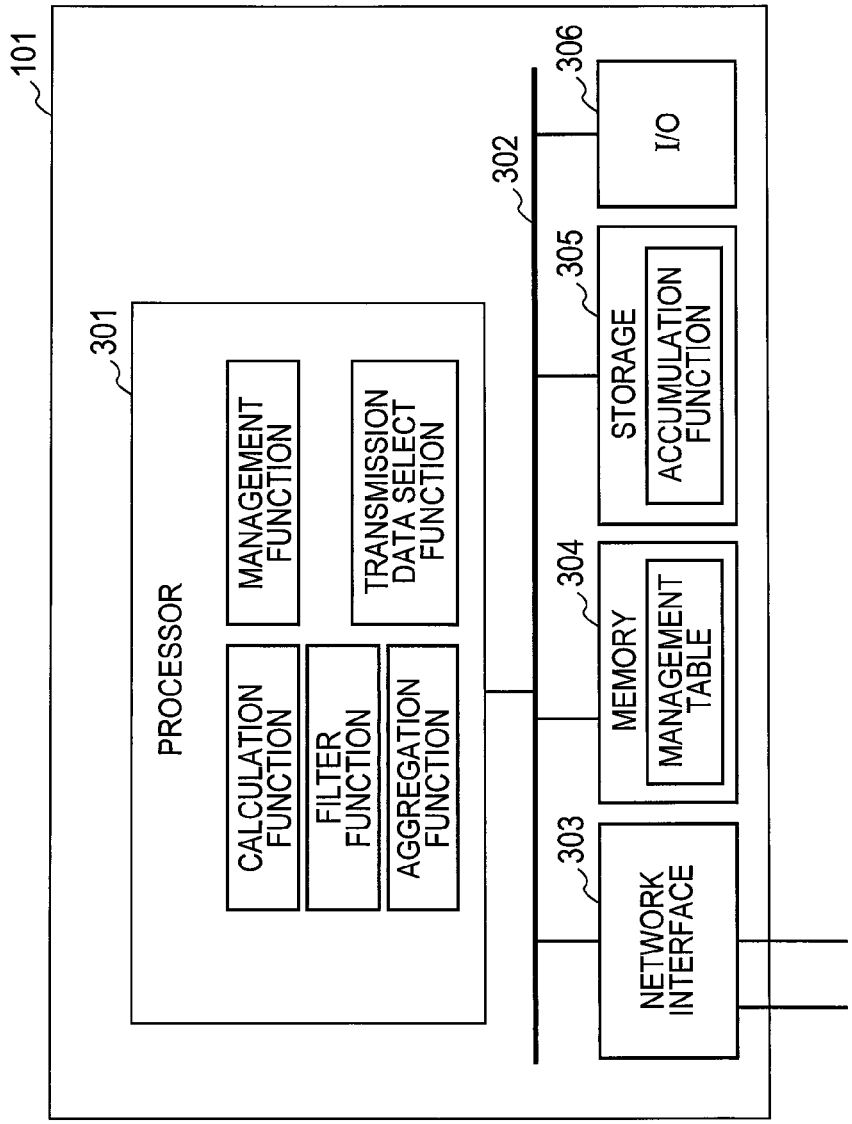
FIG. 3 is a block diagram illustrating one example of device configuration of the EN according to the first embodiment.

FIG. 3 is a block diagram illustrating one example of device configuration of the EN 101 of this embodiment. In the diagram, the reference sign 301 represents a processor configuring a processing unit described above, for example, a Center Processing Unit (CPU). In the processor 301 in the diagram, various functions described in FIG. 2, that is, the calculation function, the filter function, the aggregation function, the management function, and the transmission data select function are schematically illustrated.

To an internal bus 302 to which the processor 301 is connected, a network interface being an interface unit corresponding to the network communication function 201, 208, a memory 304 being a memory unit in which the EN management table 209 is stored and a storage 305 being the accumulation function 202, and further an input-output unit (I/O) 306 to which a mouse, a keyboard, and a display are connected are connected.

The calculation function, the filter function, the aggregation function, the management function, and the transmission data select function in FIG. 3 are realized by reading a program stored in the storage and executing by the processor 301. However, various functions of the EN 101 may be configured as a dedicated hardware. In FIG. 12, one example of an EN management table 209 in the EN 101 is illustrated. As illustrated in FIG. 1, in the distributed information communication system of this embodiment, the multiple ENs 101 exist. Each EN 101 receives each content of the management table 209 illustrated in FIG. 2 from the MN 103 described in detail below and stores the contents in the memory 304 in The EN 101. In the EN management table 209, two types of tables 1210, 1230 are illustrated. One table is the table 1210 of the information sent from filtering and the like, sensors, and terminals, and the other table is the table 1230 of the feedback information from the IN 102 and the DC 106.

More specifically, the table 1210 in the diagram stores information about the calculation function, the filter function, the aggregation function, and the accumulation function to input data from each of the sensors 107 and the terminals 109, and destination address and secondly destination address being a sent target into the sensors 1221A-1221N and terminals 1222A-1222N which are targets of the table. The table 1230 stores a feedback control command 1231 to the actuators 108 in the actuators 1241A-1241N which is a target of the table.

Subsequently, one example of configuration of the IN 102 of this embodiment is described using FIG. 4 and FIG. 5.

Figure 4:
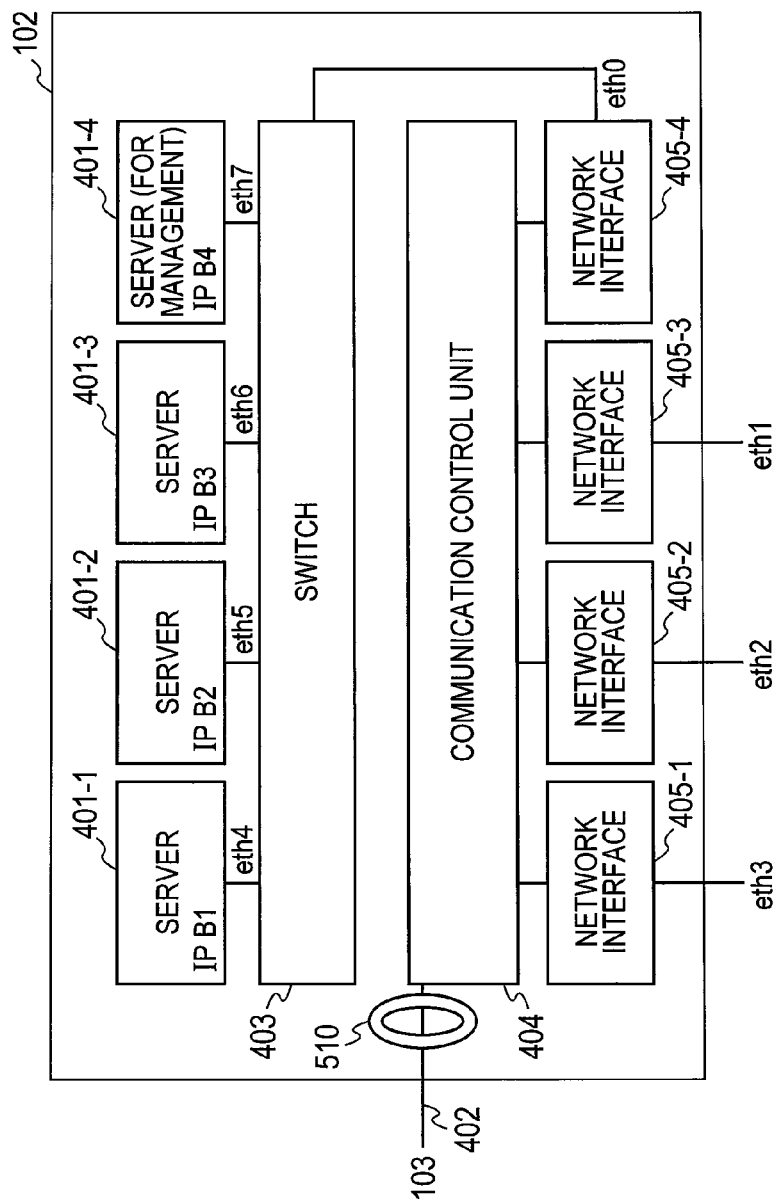
FIG. 4 is a block diagram illustrating one configuration example of an intelligent node (IN) according to the first embodiment.

FIG. 4 is a block diagram illustrating one example of hardware configuration in the IN 102. In the diagram, the reference signs 401-1 to 401-3 represent a plurality of servers for information processing configuring a server function unit located in the IN 102, that is, computers including a processor being a processing unit, a memory being a memory unit, an network interface, an input-output unit, and the like, and the servers execute the real time type processing described above. The reference sign 401-4 represents a server for management being a management function unit. These servers 401-1 to 401-4 receive and send various data and control information through an internal switch 403, a communication control unit 404, and a network interface 405.

As illustrated in FIG. 4, Media Access Control (MAC) addresses eth3, eth2, eth1, eth0 are assigned to the network interfaces 405-1 to 405-4 of the IN 102, and IP addresses IP B1 to IP B4 and MAC addresses eth4 to eth 7 are assigned to the servers 401-1 to 401-4. In this example, the switch 403 is connected to the servers 401-1 to 401-4 and the network interfaces 405-1 to 405-4 using Ethernet (registered trademark). As these Ethernets, for example, 10 gigabit Ethernet can be used. Obviously, not Ethernet but an interface based on the standard of the aforementioned dedicated device can be used. A reference sign 402 is a port for management. This port is connected to the management node (MN) 103 of FIG. 1 and used for receiving and sending various data for management.

In the diagram, the communication control unit 404 communicates with externals, similar to a common router device, and has a function of performing transfer control of a packet as well as an information processing position change function for improving response speed, which is particularly deteriorated by the communication delay, by changing the information processing position according to a direction of the MN 103 as described in detail below.

The server function unit configured by the multiple servers 401 performs information processing and generates feedback information being the result. At this time, a function in which higher speed of application execution itself with a plurality of servers is achieved and the response speed is improved in an aspect of information processing can be provided. The server function units 401-1, 401-2, 403-3 of the IN 102 in this embodiment provide, for example, a flow-based information processing function which performs difference arithmetic of input data in a certain period of time on memories, and a hardware offloading function which directly executes, protocol processing such as Transmission Control Protocol/Internet Protocol (TPC/IP), routine application processing, and frequent processing by the hardware.

The server for management 401-4 configuring the management function unit manages and sets resources in the IN and manages the included EN 101. The server for management 401-4 periodically reports information of these resources, use status, and load status, and responds to assignation and deletion of a new application from the MN 103 and a resetting request of the resource.

Figure 20:
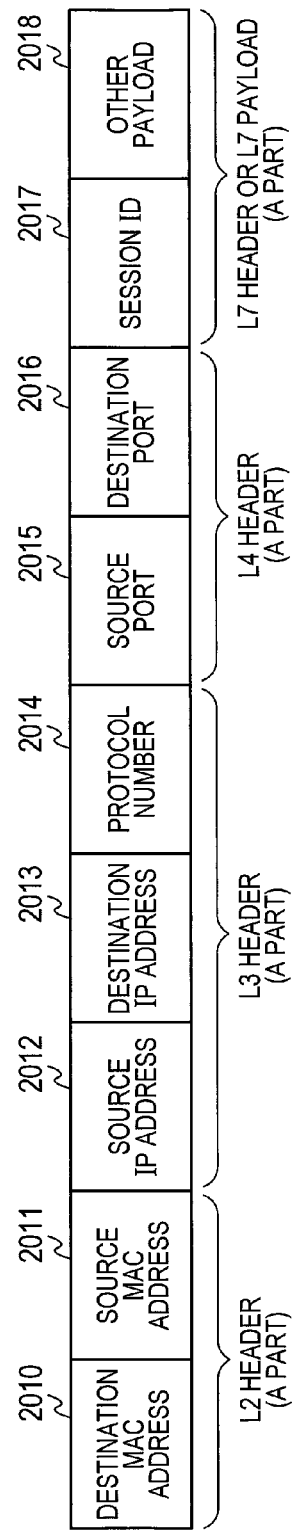
FIG. 20 is a diagram illustrating one example of a communication packet used in the distributed information communication processing system according to the first embodiment.

In FIG. 20, one example of excerption of a main field of a header unit of a communication packet used in the system of this embodiment is illustrated. In a header of layer 2 (L2) being the data link layer, a destination MAC address 2010 and a source MAC address 2011 are located. In a header of layer 3 (L3) being the network layer, a source IP address (SIP) 2012, a destination IP address (DIP) 2013, and a protocol number (Protocol) 2014 bare located. This L3 header is used for routing packets from the source IP address (SIP) 2012 to the destination IP address 2013 when IP communication is performed. A type of protocol of L4 is classified by the protocol number (Protocol) 2014. In the IN 102 of this embodiment, these are used as conditions for detecting a flow.

Further, in a header of a layer 4 (L4) being the transport layer, a source port (SP) 2015 and a destination port (DP) 2016 are located. The L4 header is used for indicating a communicated application, and these are also used as the conditions for detecting the flow. Finally, in a header of a layer 7 (L7) being the application layer or an L7 payload (partial excerpt), a session identifier (ID) 2017 and other payload are located. This session ID 2017 is an identifier for recognizing accesses from specific users and information senders.

Figure 5:
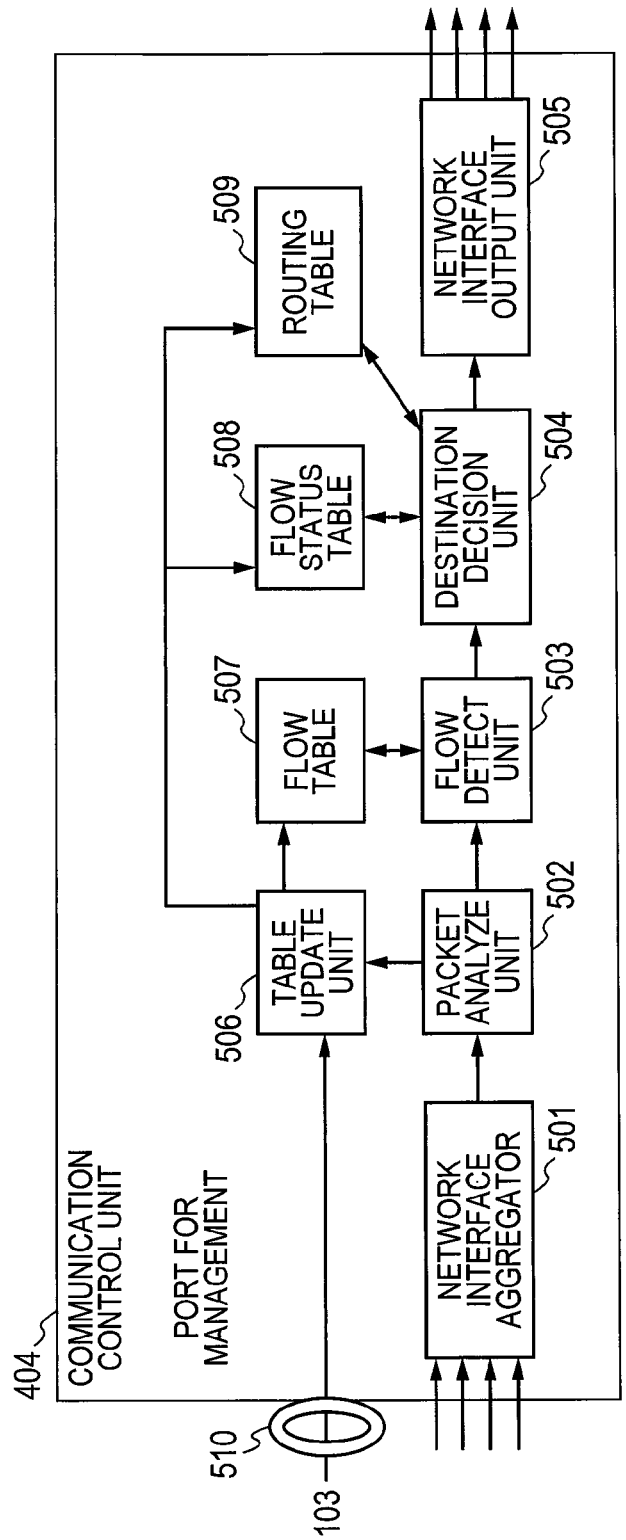
FIG. 5 is a block diagram illustrating one configuration example of a communication control unit in the IN according to the first embodiment.

FIG. 5 is a block diagram illustrating one example of the function configuration of the communication control unit 404 of FIG. 4 described above. As illustrated in FIG. 5, the communication control unit 404 is constituted by each function block of a network interface aggregator 501, a packet analyze unit 502, a flow detect unit 503 including a flow table 507, an destination decision unit 504 including a flow status table 508 and a routing table 509, a network interface output unit 505, and a table update unit 506, and further a port for management 510. Each function block may be configured as not only software but also hardware. When the function block is configured as software, the communication control unit 404 can realize the software by executing a program on memories of a processer (CPU) using the processor and the memories.

In the communication control unit 404, firstly, the network interface aggregator 501 processes to aggregate packets flown from the multiple network interfaces 405-1 to 405-4 of FIG. 4. The aggregated packets in this process are sent to the packet analyze unit 502 and are analyzed. Here, a common communication packet used in the communication protocol described above can be used as the packet used in the embodiment.

The communication control unit 404 of FIG. 5 includes the flow table 507 and the flow status table 508, other than the routing table 509 which a common communication device uses for destination search, and manages a "search key" for distinguishing user's application packets, a "status" indicating a communication status, and application execution position information, as described in detail below. A target of the search key is packet header information, and, in some cases, packet payload information. Communication "status" manages whether a connection is established or not, and can selects a disconnected status of the connection when the execution position is dynamically changed. The execution position explicitly assigns the aforementioned server function unit in the table, when the execution position is the server function unit in the self-IN. When this assignation exists, this destination is used in preference to the routing table 509. When the execution position is other IN 102 or the DC 106, representative destination information indicating the other IN or the DC is used, and explicit server function unit assignation in the aforementioned IN can be entrusted to other IN or the DC.

The IN 102 changes the execution position of the application for the aforementioned user to any one of its own internal servers 401, or other IN 102, or the initial DC 106 by a direct direction from the MN 103 or policy setting through the port for management 510. Consequently, the IN 102 monitors a load status of its own multiple server function units and notifies to the MN 103. Thereby, the MN 103 or the server for management 401-4 recalculates the execution position. The IN 102 reflects the result to the tables of the IN 102 described above, and dynamically changes the information processing position.

As described above, the communication control unit 404 in the IN 102 of the system of this embodiment controls the change in the position of information processing which processes the packet. More specifically, the table update unit 506 of the communication control unit 404 changes an MAC address of the L2 header provided for the packets by rewriting an "interface" in the flow status table 508. For example, when the destination of the packets is forcibly changed to an IN's 102 own server 410-1, the packets can be sent to the server 401-1 by rewriting the source MAC address 2011 to eth0 of FIG. 4 and the destination MAC address 2010 to eth4 which is the MAC address of the server 401-1. As described above, the communication control unit 404 performs the information processing position change function in the system, in addition to the common communication function.

In other words, the optimum processing position in the network is not unchangeable position but the position which is momentarily changed depending on the status. This is caused by a network status, a load status of used arithmetic resources, movement of user himself/herself in physical space, or the like. Consequently, in the system configuration of this embodiment, a direction of the MN 103 makes the IN 102 change the information processing position by the configuration of the communication control unit 404 described above. More specifically, as described above, execution of information processing, which is originally executed by the DC 106, by the server function unit on the IN 102, change in assignation of the information processing between the multiple servers 401-1 to 401-3 in the self-IN, and, contrary, change for removing the information processing from the self-IN 102 to other IN 102 or the DC 106 can be performed. This information processing position change function is described below using specific examples of the flow table and the flow status table.

Figure 6:
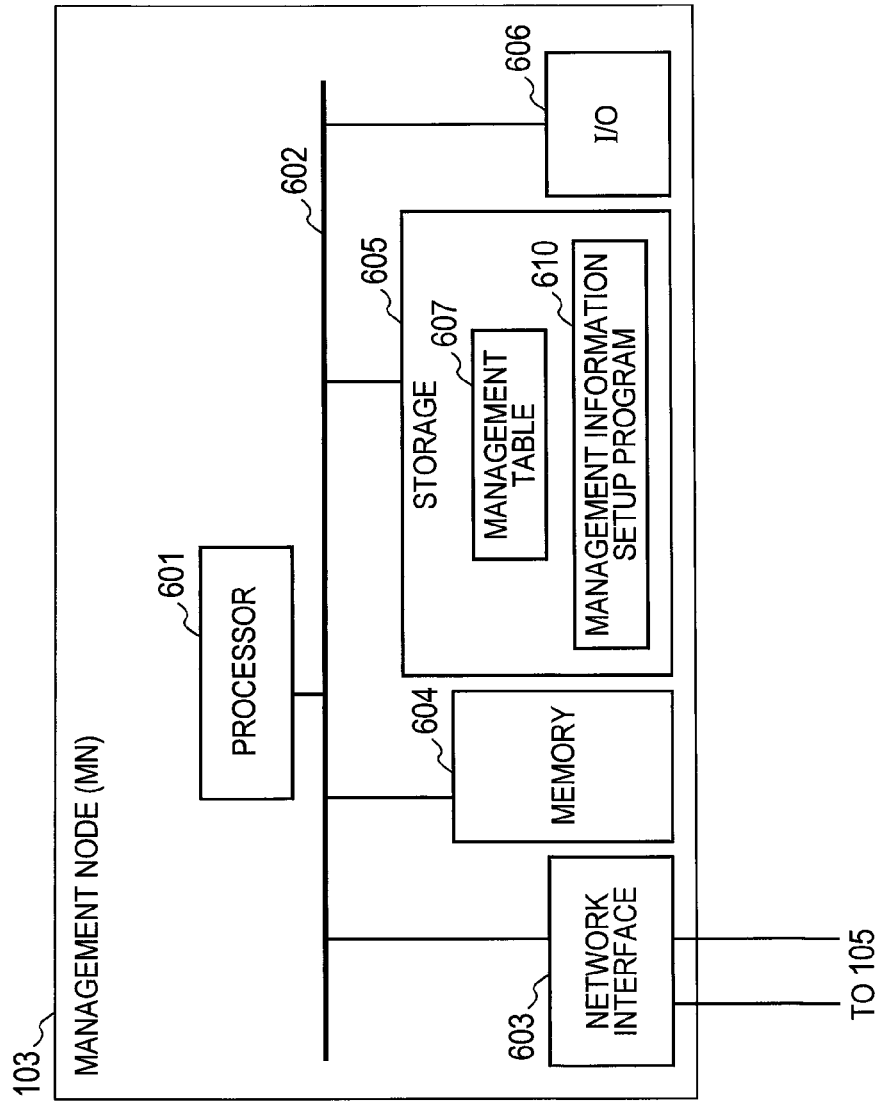
FIG. 6 is a block diagram illustrating one configuration example of a management node (MN) according to the first embodiment.

One example of device configuration of the MN 103 described above is illustrated in FIG. 6. The MN 103 is, for example, an information processing device, and a processor 601 operates and manages the system of this embodiment. The processor 601 is connected to an internal bus 602, and a network interface 603, a memory 604, a storage 605, and an input/output unit (I/O) 606 are connected to the internal bus 602. The storage 605 stores a management information setup program 610 which the processor 601 executes and a management table 607 to which the processor 601 refers. When the processor 601 executes the management information setup program 610, the management table 607 is retained in the memory 604.

This MN 103 collects performance information and position information of the IN 102 and the EN 101, allocates an application and sets resources in consideration of response speed, reliability, and electric power saving, and sets the information processing position as its operation management function. In addition, the MN 103 monitors communication delay and processing delay of the application, analyzes bottleneck of the distributed information communication processing system, and uses the result for change in the dynamic information processing position and resetting of the communication pathway.

Figure 7:
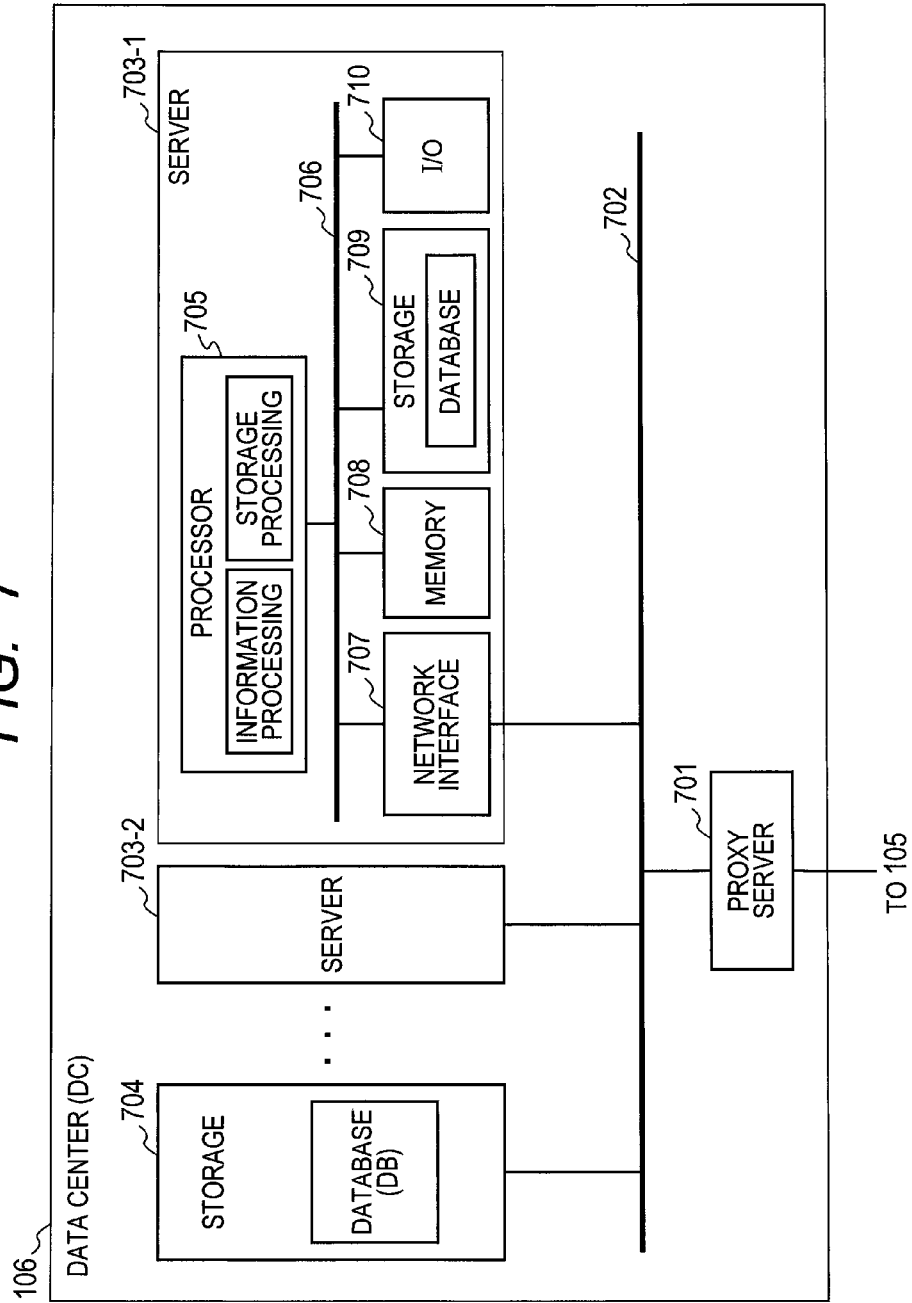
FIG. 7 is a block diagram illustrating one configuration example of a data center (DC) according to the first embodiment.

One example of device configuration of the DC 106 is illustrated in FIG. 7. Usually, the DC 106 is connected to an external network, and is configured by a proxy server 701 functioning as a load balancer, a plurality of servers 703-1, 703-2 connected to the proxy server 701 through a communication path 702, and a storage 704. The storage 704 is often located behind the servers 703-1, 703-2. Each of the servers 703-1, 703-2 has a common computer configuration and includes a processor 705, an internal bus 706, a network interface 707 being an interface unit, a memory 708 and a storage 709 configuring a memory unit, and further an input-output unit (I/O) 710. Similar to the processor in the IN 102, the processor in the server 703 performs information processing as well as further performs storage processing.

More specifically, the DC 106 stores various pieces of information obtained through the network 105 by the storage processing of the processor 705 in the server 703 and forms database (DB). Also, the DC 106 processes generation of high value-added information and knowledge from this DB being stored information. This process which uses a large amount of DB is a process which the EN 101 and the IN 102 described above cannot perform.

As describe above, the entire configuration of the distributed information communication processing system of this embodiment and one configuration example of each constituent are described, and then specific examples of the flow table 507 and the flow status table in the communication control unit 404 of the IN 102 of FIG. 5 used for the previously described information processing position change function are described using FIG. 10 and FIG. 11.

One example of the flow table 507 is illustrated in FIG. 10. The flow detect unit 503 of FIG. 5 detects a flow and specifies a flow number by using this flow table 507. As is clear from the flow table 507 of FIG. 10, it goes without saying that the above-described "search key" 1001 used for the flow detection is corresponding to the information of various layers obtained by analyzing the packet exemplified in FIG. 20. An aforementioned flow detection result "result #" 1002 is outputted to the destination decision unit 504 of FIG. 5. Each flow is corresponding to each application.

As illustrated in FIG. 11, the destination decision unit 504 determines the network to which the aforementioned packet is outputted based on the detection result of the flow detect unit 503 using the flow status table 508, and outputs to the network interface output unit 505. As is clear from FIG. 11, the flow status table 508 stores and updates a "status" 1102 indicating the communication status described above, and information of a "next hop" 1103 corresponding to the application execution position information described above and an "interface" 1104, which are corresponding to the "flow" number 1101. A reference sign 1105 is one of the application execution position information and indicates an explicitly set "new destination" field. As illustrated in FIG. 11, the new destination field effectively serves for an application which does not retain a "status".

The flow status table 508 recognizes a group of packets which corresponds with designated conditions as a flow and retains and manages the connection status and the destination of the flow. When the application execution position is changed, for example, the flow is reallocated to a server function unit having lower load based on its priority. At this time, the destination information is changed only for disconnected flows so as not to provide adverse effect for execution of the application.

The "next hop" 1103 in the flow status table 508 is an IP address (L3 logical information) of a device which is required to subsequently be relayed, and the "interface" 1104 is an interface name (corresponding to a source MAC address, L2 physical information) of the aforementioned device connected to the next hop 1103. The destination MAC address is determined by processing an Address Resolution Protocol (ARP) to the IP address of the next hop 1103, and the result is recorded in an information list generally referred to as an ARP table. In this example, description of the ARP table is omitted.

In the flow status table 508 in FIG. 11, each of flow#0 to flow#3 in the flow 1101 corresponds to "opening", "established", "closing", and "not connected" respectively as the "status" 1102. The "new destination" 1105 is, for example, represents that an IP address (IPD) of a new destination device is set as a final destination of the aforementioned flow when the "status" 1102 is in "not connected" as flow#3.

The MN 103 previously described sets the flow table 507, in which the one example is illustrated in FIG. 10. Specifically, as described below using a flow chart, a combination of fields desired to be determined as a flow, for example, a combination of the destination IP address "DIP", the source IP address "SIP", the destination port "DP", the source port "SP", and the like described above, is notified to the IN 102 together with the flow number "flow#". The communication control unit 404 of the IN 102 which receives this combination of fields sets and updates the flow table 507 using the table update unit 506. Priorities of each flow may be determined and notified with the information of the field combination which is notified together with the flow number. The flow table 507 and the flow status table 508 can be generated by a dedicated hardware circuit or software.

All packets other than the packet which is sent to the destination of the self-IN 102 are sent to the flow detect unit 503 after various pieces of header information and, if necessary, payload information in the packet are analyzed in the packet analyze unit 502 and elements which the flow table 507 manages are extracted, and the flow detect unit 503 specifies the flow number "flow#" of the aforementioned packets. The packet which is sent to the destination of the self-IN 102 is a control packet and the table update unit 506 updates the flow table 507 when the content of the control packet is flow update information. When the content of the control packet is load information described below, the packet is used for updating the flow status table 508.

As described below using a flowchart, the MN 103 performs initial setting of the flow status table 508 and policy definition for updating the flow status table 508 as described above. Specifically, the MN 103 previously prepares initial values of the "next hop" and the "interface" of the corresponding flow as the initial setting. When an application is firstly operated on the DC 106, the "next hop" is set to an IP address of a communication device of the next transfer target for transferring the packet to the DC 106, and the interface is set to a physical port of the IN 102 connected to the communication device.

When the flow status table 508 is generated as the software, for example, the table is generated on the memory in the communication control unit 404. The destination decision unit 504 also refers to the common routing table 510. In this embodiment, for the flow registered in the flow status table 508, change in the destination of the packet is possible by prioritizing not the routing according to the routing table 510 but the routing listed in the flow status table 508.

As a modified embodiment, flow status table 508 may be stored in the memory in the server 401 of the server function unit. In this case, in the communication control unit 404, for a flow which potentially changes the destination, the destination decision unit 504 transfers the packets belonging to the aforementioned flow to the aforementioned server 401 independently of application discontinuity using a common policy base routing function. The server 401 includes the flow status table 508 in a software manner and logically, and the packets are transferred just as the description in the aforementioned flow status table. If the speed is not sufficient, a dedicated hardware circuit can be installed in the server 401, because the server 401 is usually operated by software executed by the CPU.

When the destination is changed to the server function unit of the self-IN 102, the server 401 of the self-IN receives packets which do not have the IP address of the server itself. As long as the setting remains a common setting, the packet cannot be received. Therefore, a previous setting, that is, the setting so as to receive the destination IP address of the aforementioned flow is set at the time before setting the destination IP address to the server itself according to the flow status table 508. When a packet is returned to the aforementioned flow, the source IP address is set to not the original IP address of the server itself but the destination IP address of the aforementioned flow described above. By this operation, for example, in the terminals 109 and the EN 101, a desired application can be executed without discordance on the server function unit made by the multiple servers in the IN 102 of this embodiment as an actual situation with sending the packet to the original destination IP address.

When fields of the "new destination" 1105 illustrated in the flow status table 508 of the FIG. 11 are added, the destination IP address of an input packet is changed to an IP address listed in the "new destination" 1105 in the destination decision unit 504. In this case, the destination decision unit 504 once terminates the communication and communication to the "new destination" 1105 is newly started. In other words, a method for using the "new destination" 1105 of the flow status table 508 once terminates the communication to the terminal, and performs new communication to the new destination. As a result, the terminal communicates to the new destination.

As described above, also in the system of this embodiment, the routing table 509 is used together for determining an destination of the packet from the IN 102. More specifically, when it is found that registration does not exist from the result of searching the flow status table 508, thereafter, the communication control unit 404 searches the routing table 509 as usual and determines the "next hop" and the "interface" indicating the destination. The communication control unit 404 may parallelly search the flow status table 508 and the routing table 509. In this case, when registration exists in the flow status table 508, an destination of the flow status table 508 is preferentially used.

When the flow status table or the routing table is used, it is a common point that the communication control unit 404 determines the destination from the IN 102. However, the different point is that when the routing table is used, the communication control unit 404 determines the destination to a destination IP address according to routing protocols such as Open Shortest Path First (OSPF) and Border Gateway Protocol (BGP), while when the flow status table in this embodiment is used, the communication control unit 404 determines the destination corresponding to a plurality of fields in a packet depending on a direction on the MN 103 and a load status of the server function unit of the IN 102. In other words, the communication control unit 404 changes the destination depending on a status of the flow and changes a server position where the application is executed, that is, a dynamic information processing position described above by using the flow status table in this embodiment.

As described above, the one example of the device configuration of the distributed information communication processing system in this embodiment and the one example of the information processing position change function are described. Subsequently, before describing the entire operation of this system, one example of a service performed in the system of this embodiment is roughly described using FIG. 19. Other examples of the service are collectively described in other embodiments following the first example.

Figure 19:
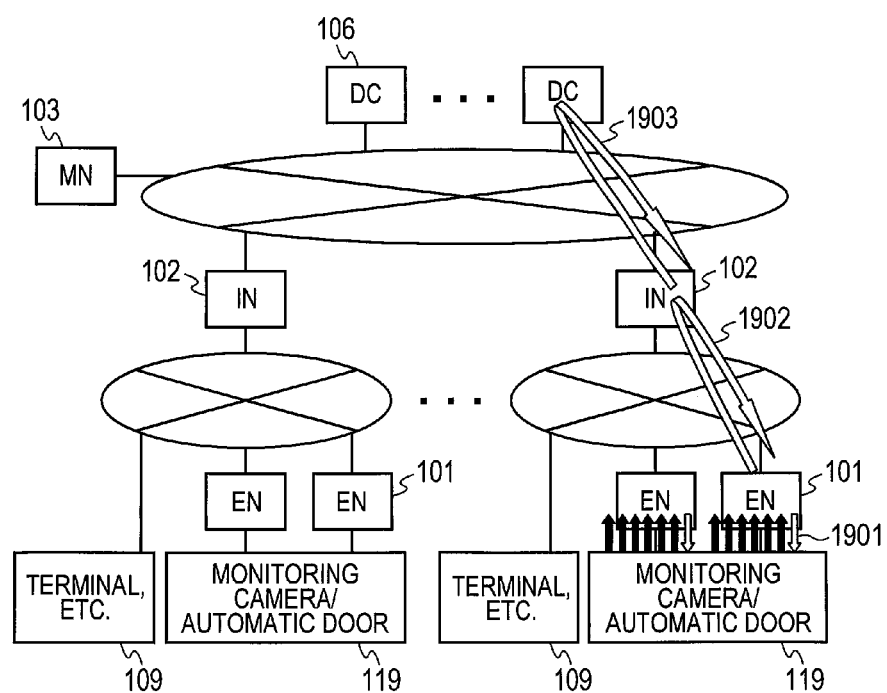
FIG. 19 is an explanatory diagram illustrating a flow of information in a distributed information communication processing system according to the first embodiment.

In FIG. 19, the block in which the same number is assigned as the whole system configuration diagram in FIG. 1 represents the same element. In the system of the diagram, an example applied to a face authentication automatic door system in which a face of a person who enters is authenticated by a monitoring camera located at the automatic door at the entrance of the room is illustrated. In the diagram, a reference sign 119 represents the automatic door with the monitoring camera.

First, camera image data is inputted from the automatic door with the monitoring camera 119 to the EN 101 being a first network node as illustrated by an arrow 1901, and a face image is extracted by the calculation function or the filter function described above in the EN 101. The extracted face image data is sent to the IN 102 being a second network node as illustrated by an arrow 1902. The IN 102 cashes a part of a face image data DB from the DC 106 and verifies identification of the face image data extracted and sent from the EN 101 using the data of the retained face image data DB. When the face is determined to be identified with the face image data, the IN 102 sends a door open command to the EN 101 as illustrated by the arrow 1902. When the face is determined to be not identified, the IN 101 sends a command of not opening the door. The EN 101 receiving the door open command generates a processing command for a door control device of the corresponding automatic door with the monitoring camera 119 and feed-backs the processing command as illustrated by the arrow 1901. An arrow 1903 indicates the case that when execution result log of the IN 102 is stored, or when more face image DB is requested and received in the case that the face image DB by which the identical detection should be performed is insufficient, the IN 102 requests processing to the DC 106 in a situation in which the identification inspection cannot be performed in the IN 102.

Figure 13:
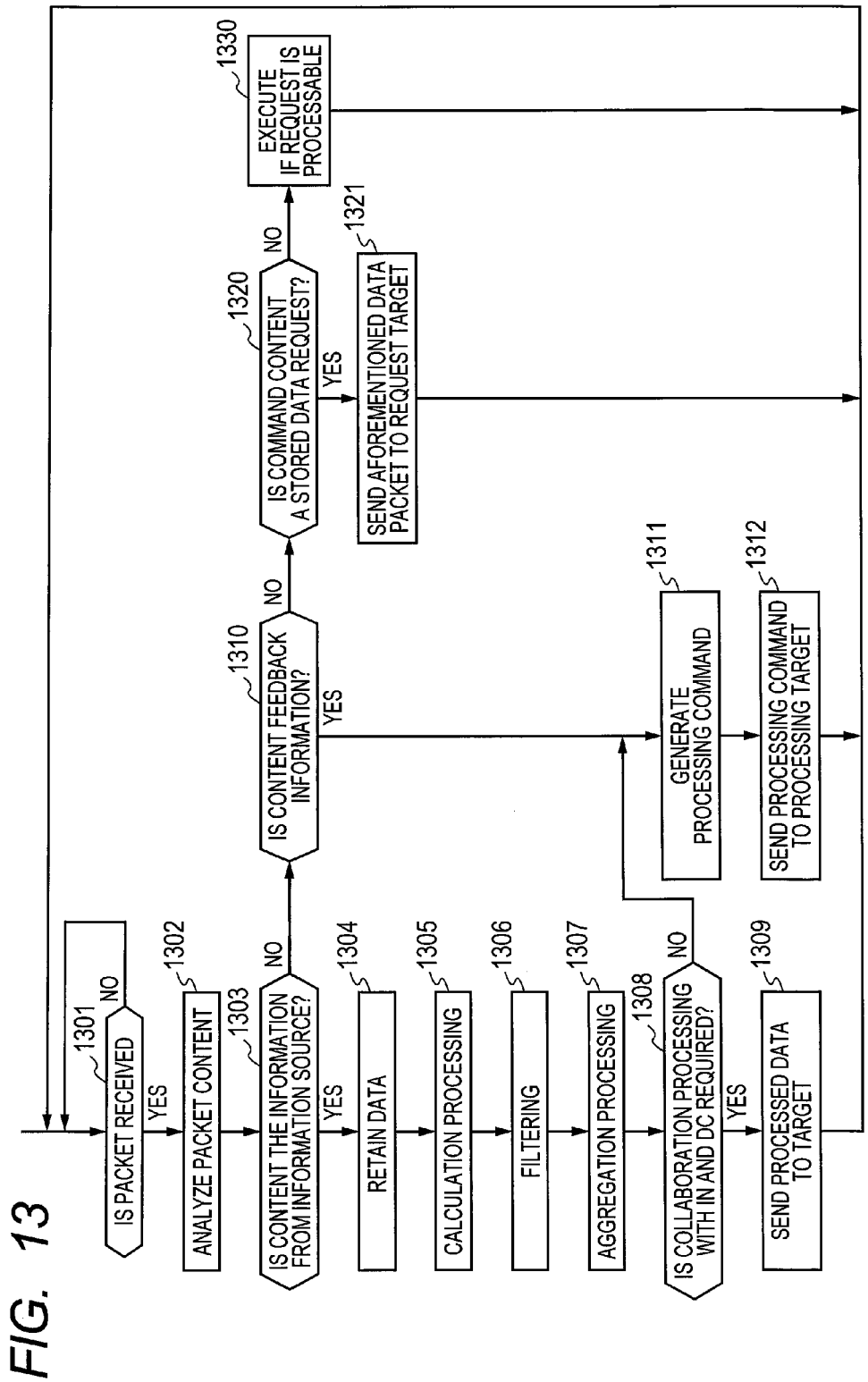
FIG. 13 is a flowchart illustrating one example of a processing of the EN according to the first embodiment.
Figure 14:
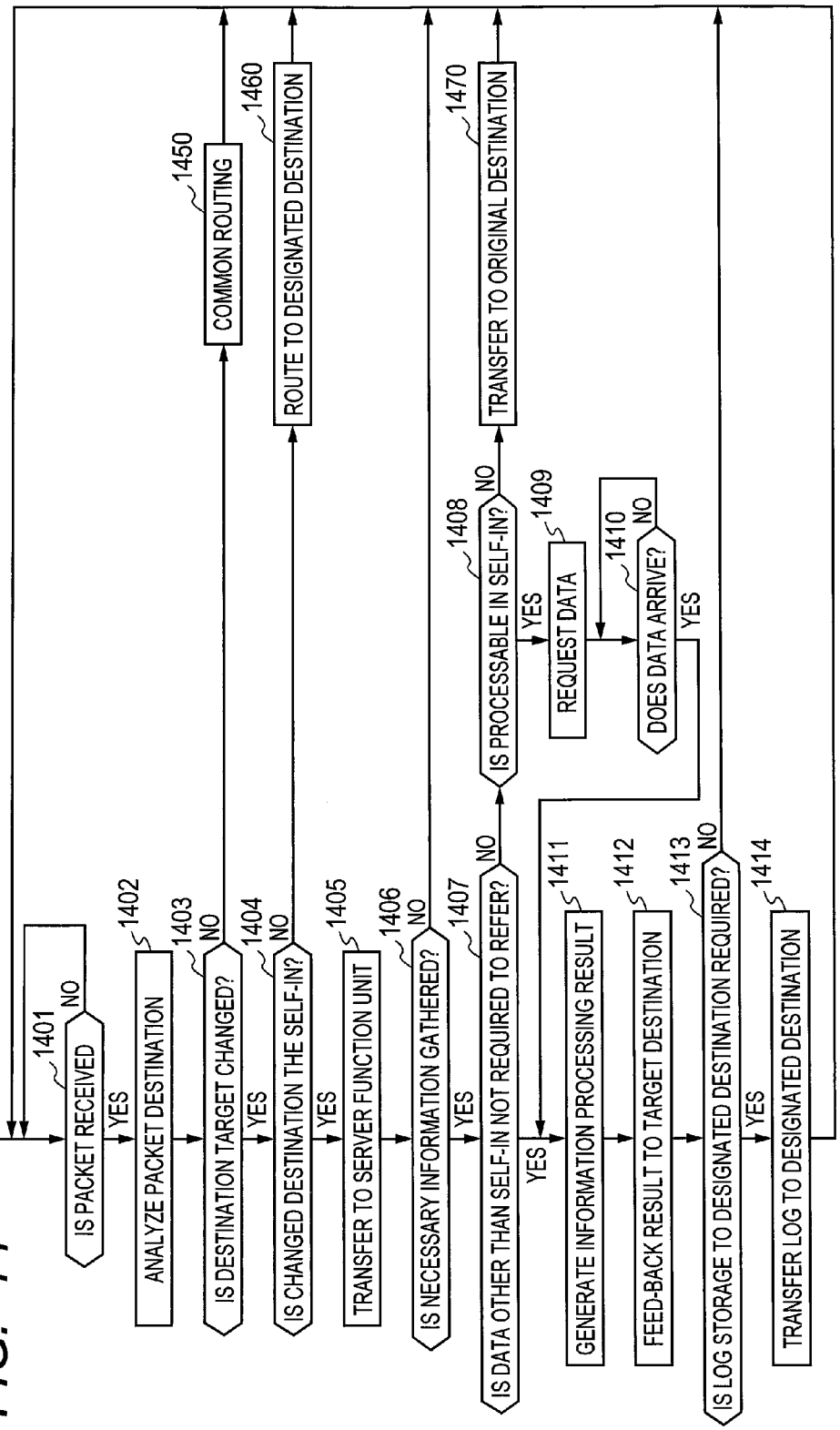
FIG. 14 is a flowchart illustrating one example of a processing of the IN according to the first embodiment.
Figure 15:
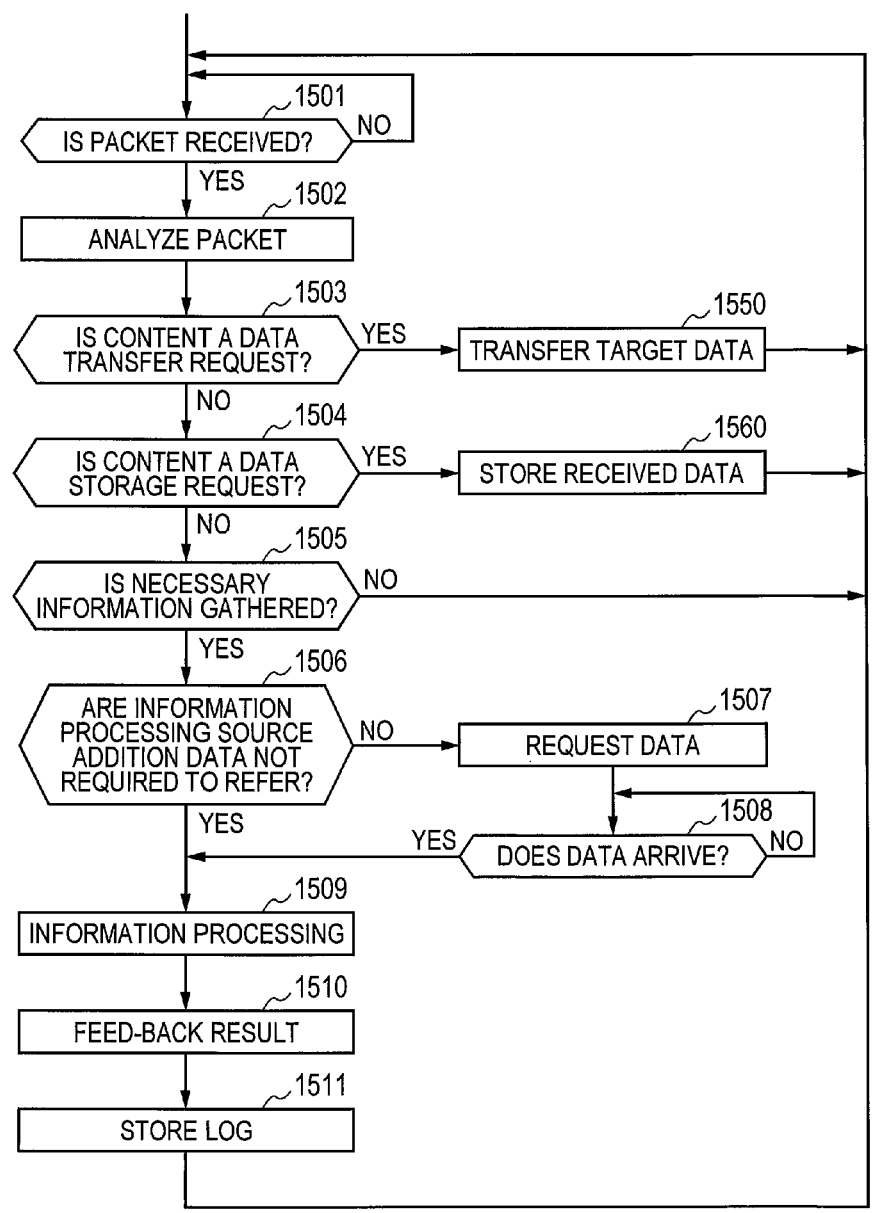
FIG. 15 is a flowchart illustrating one example of a processing of the DC according to the first embodiment.

Subsequently, a processing operation of the distributed information communication processing system of the first embodiment described above is described using processing flowcharts FIG. 13 to FIG. 18 and FIGS. 8 and 9. FIG. 13, FIG. 14, and FIG. 15 illustrate basic processing flows of the EN 101, the IN 102, and the DC 106, respectively.

In FIG. 13, the EN 101 periodically checks whether a packet from the sensors 107, the actuators 108, the terminals 109, the IN 102, and the like to the network interface is received or not (a step 1301; hereinafter, the word "step" is omitted in a parentheses). When the packet is received, the EN 103 analyzes the content of the packet (1302).

The EN 101 determines whether the content of the packet is information from the various information sources such as the sensors 107 or not (1303), and when the information is information from the various information sources (YES, hereinafter omitted), the data is retained (1304). The required calculation processing (1305), filtering (1306), and aggregation processing (1307) are sequentially performed to the retained data. In the case of the face authentication automatic door system as described above, when image data packets are received from the monitoring camera, the EN 101 determines the packets as the information from the various information sources and performs face image extraction processing.

After receiving the result, the EN 101 determines whether cooperation processing with the IN 102 and the DC 106 is required or not (1308). When the cooperation processing is determined to be required, the EN 101 sends processing data to the cooperation target (1309). In the case of the service described above, the face image data is sent to the IN 102.

In the step 1303, when the content of the packet is determined as not being the information from the information sources (NO, hereinafter omitted), the EN 101 determines whether the packet content is feedback information from the upper IN 102 and the like or not (1310). When the packet content is the feedback information, the EN 101 generates a processing command (1311). When the determination in the step 1308 is NO, the EN 101 similarly generates the processing command. The generated processing command is sent to its processing target as packets (1312). In the case of the service described above, the EN 101 receives information such as "open the door" as the feedback information, and generates a processing command for the door control device.

In the step 1310, when the EN 101 determines that the packet content is not the feedback information, subsequently the EN 101 determines whether a command content is a stored data request or not (1320). When the EN 101 is a request of the stored data, the aforementioned data packet is sent to a requested target (1321). When the command content is not the stored data request, the EN 101 performs the request (1330), if the request is processable by the EN 101.

In FIG. 14, the IN 102 periodically checks whether a packet is received from the EN 101 and the terminals 109 being under control of the IN 102, the DC 106, and the like to the network interface or not (1401), and when the packet is received, the IN 102 analyzes a packet destination (1402). The IN 102 determines whether the packet is a packet of a destination change target or not (1403). When the packet is a packet of the destination change target, the IN 102 determines whether the destination of the packet is the self-node or not (1404), and in the case of the self-node, the IN 102 transfers the aforementioned packet to the internal server function unit. When the packet is not a packet of the destination change target, common routing is performed (1450). The changed destination is other than the self-node, routing to a designated destination is performed (1460).

Different from the common router function which only refers to the destination IP address, the packet destination analysis of the step 1403 analyzes the destination referring to one or more fields of the packet illustrated in FIG. 20 and, if designated, contents of flow combing payloads of the multiple packets in the IN 102 in this embodiment as described using FIG. 10 and FIG. 11. As a result, when a description exists in the flow status table in the IN 102, the packet is transferred to the destination which is different from the destination IP address described in the packet, for example, the server function unit in the self-IN. The destination change target in the step 1403 has a meaning that the description exists in the flow status table 508 and the destination of the packet is determined by checking information other than the destination IP address. The designated destination means not the destination IP address but the described target in the flow status table 508.

Back to the flow of FIG. 14, when the packet is transferred in the server function unit of the self-node (1405), the IN 102 determines whether all of necessary data are gathered or not (1406). When all of the necessary data are gathered, the IN 102 determines whether reference to data other than the self-IN is unnecessary or not (1407). When the reference is unnecessary, the IN 102 executes information processing and generates the result (1411). As a result, the result is feed-backed to the target destination (1412). Further, the IN 102 determines whether log storage is necessary at the designated target or not (1413), and the log is transferred to the designated destination when the storage is necessary (1414).

In the example of the service described above, the IN 102 extracts the face image as necessary information processing. When the extracted face image is identified with the stored or the cached face image DB, the IN 102 generates a command for opening the door, and performs feedback in which delay is small compared with the process in the DC to the EN 101. When the extracted face image is not identified with the face image DB, the IN 102 feed-backs a command for not opening the door. In addition, the IN 102 notifies the targets such as DC 106 of control contents such as whether the door is opened or not. As other information processing, for example, whether a person through the door with the target person exists or not is analyzed and detected, and when the person through the door with the target person is detected, the IN 102 notifies previously registered destinations such as individuals and the DC of an alarm.

In the step 1407, when data other than the self-IN 102 is determined to be necessary, the IN 102 determines whether the aforementioned processing can be processed by the self-IN or not (1408). When the IN 102 determines that the process can be processed, the IN 102 requests necessary data (1409). When the data arrives (1410), the IN 102 processes the information and generates the result (1411). When the IN 102 determines that the process cannot be processed by the self-IN, the data is transferred to the original destination before the change (1470). In the case of the service described above, when the face image DB in which the identification inspection should be performed is insufficient, the IN 102 requests more face image DB to the DC 106 and continues the information processing described above after obtaining the requested face image DB. Further, the IN 102 requests the processing to the DC 103, if the service is in a situation in which the face image DB in which the identification inspection should be performed is insufficient and the identification inspection cannot be performed because of a policy in which the DC 103 and the like do not transfer the face image DB.

In FIG. 15, the DC 106 periodically checks whether a packet from the IN 102 through the network is received or not (1501). When the packet is received, the DC 106 analyzes the content of the packet (1502). As a result, the DC 106 determines whether the content is a transfer request of stored data or not (1503). When the content is not the transfer request, DC 106 determines whether the content is a data storage request or not (1504). When the content is the data transfer request, the target data is transferred (1550). For example, in the previous example of the service, the DC 106 transfers the face image data having possibility to be identified with to the IN 102 because the DC 106 retains all face image DB. When the content is a data storage request, the DC 106 stores the received data (1560).

When the content is not the storage request, the DC 106 determines whether all of necessary data are gathered or not (1505). When all of the necessary data are gathered, the DC 106 determines whether reference to additional data from the information processing sources is unnecessary or not (1056), and when the additional data is unnecessary the DC 106 processes the information (1509). In the service example described above, the information processing such as the identification inspection with face image data of the stored face image DB is executed. When the reference to the additional data is required, the DC 106 requests the data (1507). When the data arrives, the DC 106 similarly processes the information. The DC 106 feed-backs the information processing result (1510) as well as stores logs (1511). In other words when the face image matches the face image DB, DC 106 feed-backs the command for opening the door through the IN 102 and EN 101, and stores the feedback information in the log.

These are basic processing flows of the EN 101, the IN 102, and the DC 106. Subsequently, one example of a status management flow and a management information resetting flow of the EN 101, the IN 102, and the MN 103 are described using FIG. 16, FIG. 17, and FIG. 18, respectively.

Figure 16:
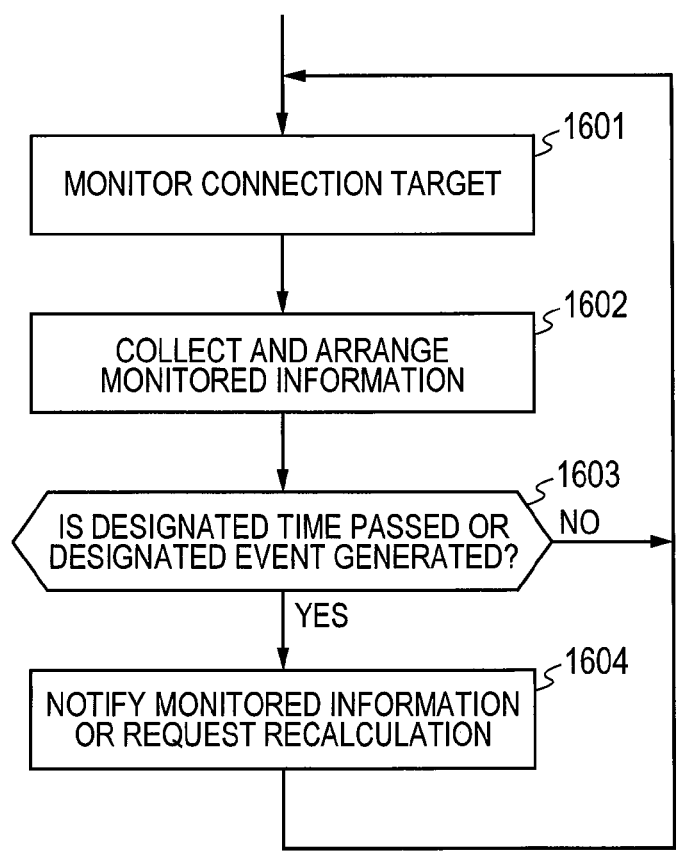
FIG. 16 is a flowchart illustrating one example of node status management processing of the EN, the IN, and the MN according to the first embodiment.

FIG. 16 is the status management flow in which the EN 101, the IN 102, and the MN 103 monitor statuses of the nodes of themselves or nodes being under control of themselves. In the flowchart, in the case of the EN 101, the EN 101 collects device statuses of various sensors 107 and other controlled devices and the status of EN 101 itself (1601, 1602). When the predetermined time is passed, or a specific event such as addition of a new sensor is generated, the EN 101 notifies the IN 102 being an upper management mechanism of the monitored information (1603, 1604).

In the case of IN 102, the IN 102 collects statuses of the EN 101 being under control of itself and the IN 102 itself (1601, 1602), and when the predetermined time is passed, or a specific event such as addition of a new EN 101, elimination of an EN 101, and addition or removal of server blades in the IN is generated, the IN 102 notifies the MN 103 being an upper management mechanism of the monitored information (1603, 1604).

In the case of MN 103, the MN 103 collects statuses of the IN 102 being under control of itself and the MN 103 itself (1601,1602), and when the predetermined time is passed, or a specific event such as addition of a new IN 102, elimination and shutdown of an IN 102, a new information processing request registration to this system, or removal of the registration is generated, the MN 103 requests a recalculation request because an assignation target of the information processing would be better to be changed (1603, 1604).

Figure 17:
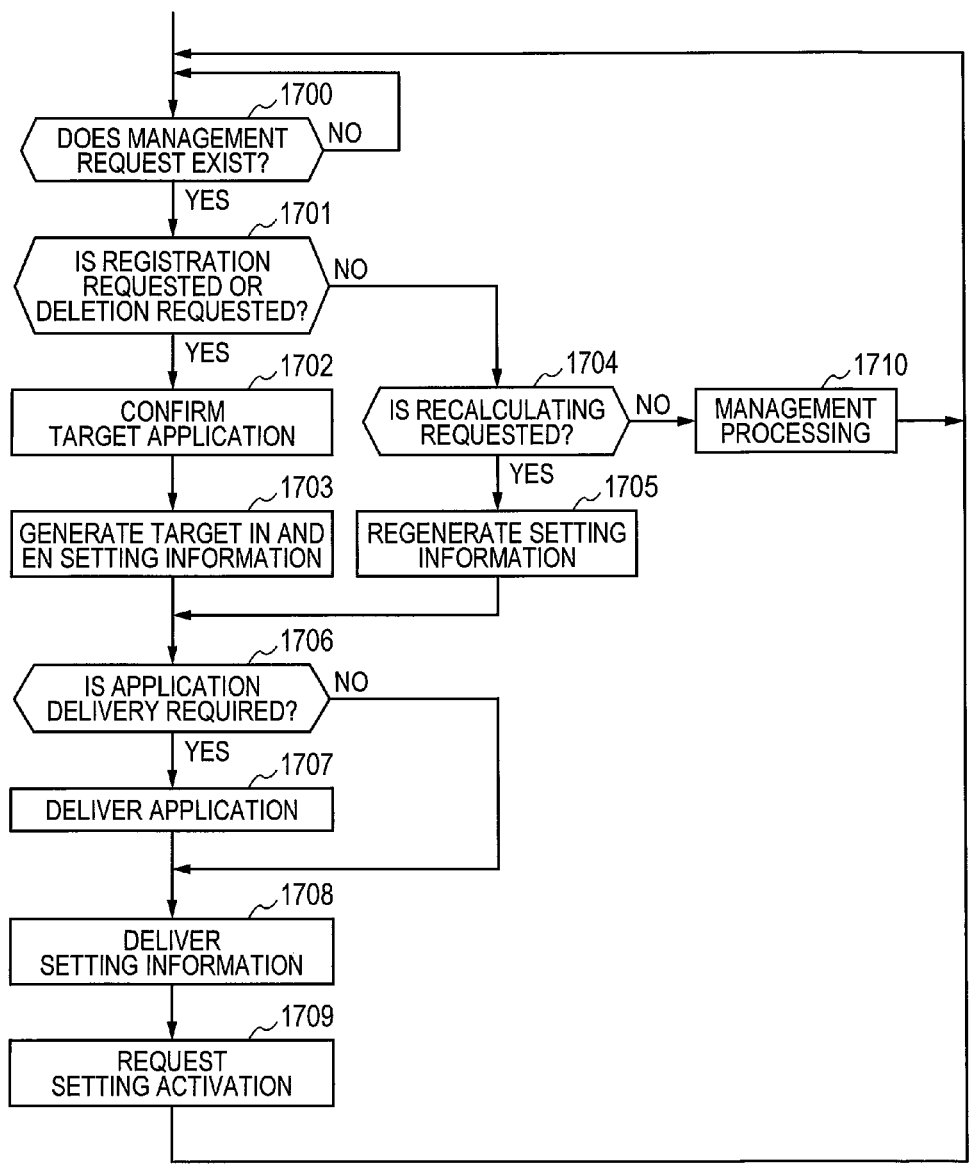
FIG. 17 is a flowchart illustrating one example of management information resetting processing of the MN according to the first embodiment.

FIG. 17 illustrates one example of the management information resetting flow in the MN 103. When the MN 103 checks whether a management request exists or not (1700) and the management request exists, a processor reads the management information setup program 610 and the management table 607 stored in the storage 605 in the MN 103 and starts resetting of the management information. For example, the processor executes the management information setup program, performs resetting by new registration or deletion, generates the setting information, and updates the management table. In other words, users having a management authority such as an Internet Service Provider (ISP) and an information management section in a corporation perform a registration request or a deletion request to an application which is desired to be used as a management request to the MN 103 of this system. At the time of this request, a service level can be designated as an option. For example, for a specific operation of the target application, service levels such as a response speed request within 100 ms, a response speed request within 500 ms, and a response speed request within 1 s can be designated. Hereinafter, the new registration is taken as one example and described.

In other words, when a new registration is requested, in determination of whether the registration request and a deletion request exist or not (1701), the existence of the request is determined. The MN 103 confirms the target application (1702), specifies the IN 102 and the EN 101 which should execute, and generates setting information of the specified IN 102 and EN 101 (1703). The setting information includes the MN management table 607 illustrated in FIG. 6, the IN management table, and the EN management table illustrated in FIG. 8 and FIG. 9, respectively. Detail of each table is described below.

The MN 103 delivers application information, for example in the case of the EN 101, programs such as the previously described calculation processing and the filtering (1706,1707), to the aforementioned IN 102 and EN 101. The delivered information may be a query including any one of weighted average calculation processing, aggregation processing, and join processing, or combination of two or more thereof.

Subsequently, the MN 103 also delivers necessary information of the IN management table and the EN management table (1708), and, finally, sends a command which activates these setting to the IN and EN (1509). By this operation, the information processing starts near the sensors 107 being the information source.

When the request is determined as the registration deletion request in the step 1701, the aforementioned user is deleted from the table and the MN 103 delivers and applies the information. When the registration request and the deletion request are determined to not exist in the step 1701, the MN 103 determines whether the request is a recalculation request or not (1704). When the request is the recalculation request, the MN 103 regenerates the setting information (1705). In the step 1704, when the request is not the recalculation request, the MN 103 executes a management processing (1710).

Figure 18:
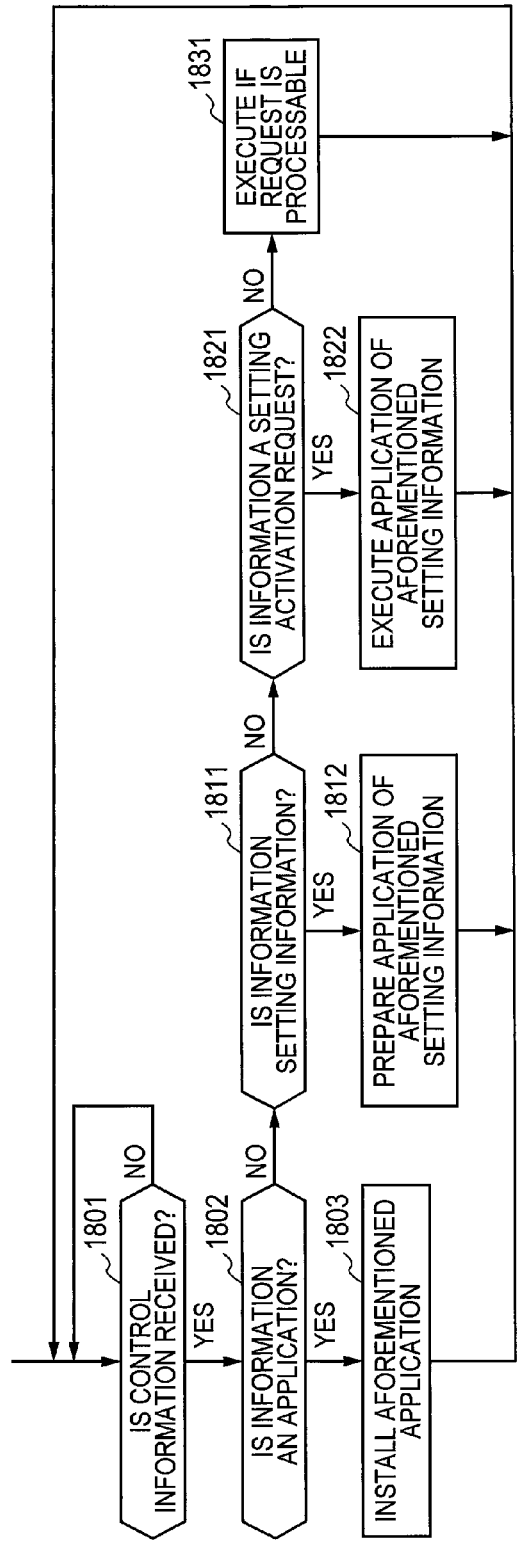
FIG. 18 is a flowchart illustrating one example of management information resetting processing of the EN and the IN according to the first embodiment.

FIG. 18 illustrates one example of a processing flow reaching to the management information resetting in the EN 101, and IN 102 based on a direction from the MN 103. Here, the resetting means that the management request is set based on, not a request from the user and the like, but the information obtained by monitoring the status of the IN 102 and EN 101. When the recalculation request is requested in the step 1604 in FIG. 16, the MN 103 recalculates various pieces of information which should be managed and generates new setting information. As a result, the NM 103 delivers the application, if the delivery of the application to the specific IN and EN is necessary. When various setting information are changed, the MN 103 notifies to the IN and EN not depending on whether the application is delivered or not. For example, to the IN 102, the MN 103 requests to add a new information processing request in the flow status table, explicitly returns the information processing position to the DC 106, transfers to other IN 102, or notifies algorithms for these operations. After this notice, the MN 103 sends a command to actually reflect the setting. The MN 103 may entrust this recalculation itself to the server for management 401-4 on the IN 102.

In the processing flow illustrated in FIG. 18, the EN 101 and the IN 102 have a common flow. Therefore, the processing flow in the case of EN 101 is described.

In the flowchart, the EN 101 checks whether control information is received or not (1801). When the control information is received, the EN 101 determines whether the control information is an application program or not (1802). If the control information is the application program, the EN 101 installs the aforementioned program (1803). When the control information is not the application program, the EN 101 determines whether the control information is setting information or not (1811). When the control information is the setting information, the EN 101 prepares to apply the aforementioned setting information (1812). In addition, the EN 101 determines whether the control information is a setting activation request or not (1821). When the control information is the setting activation request, application of the aforementioned setting information is executed (1822). On the other hand, when the control information is not the setting activation request, the EN 101 executes the control information, when the control information can be processable (1831). The control information processed here includes notice of a processing method at the time of failure generation.

Subsequently, specific examples of the IN management table and the EN management table located in the MN 103 described above according to the drawings.

Figure 8:
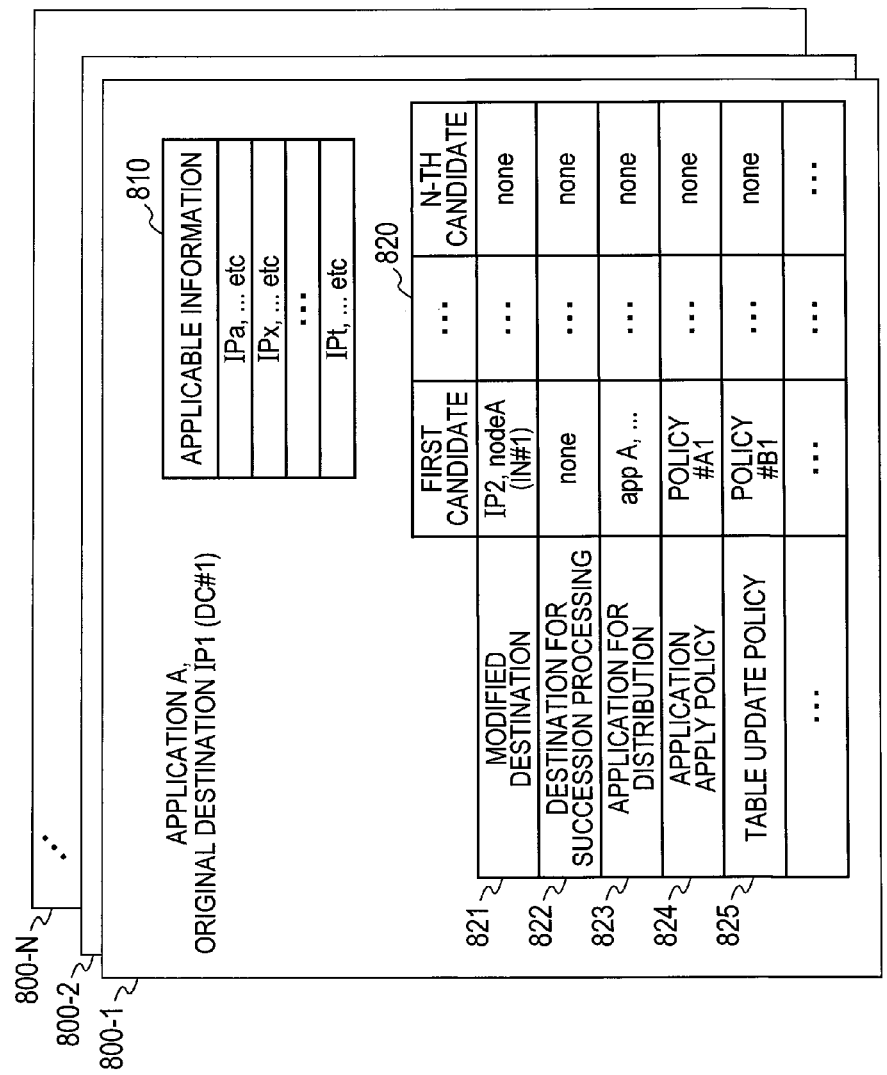
FIG. 8 is a diagram illustrating one example of an IN management table stored in a memory unit of the MN according to the first embodiment.
Figure 9:
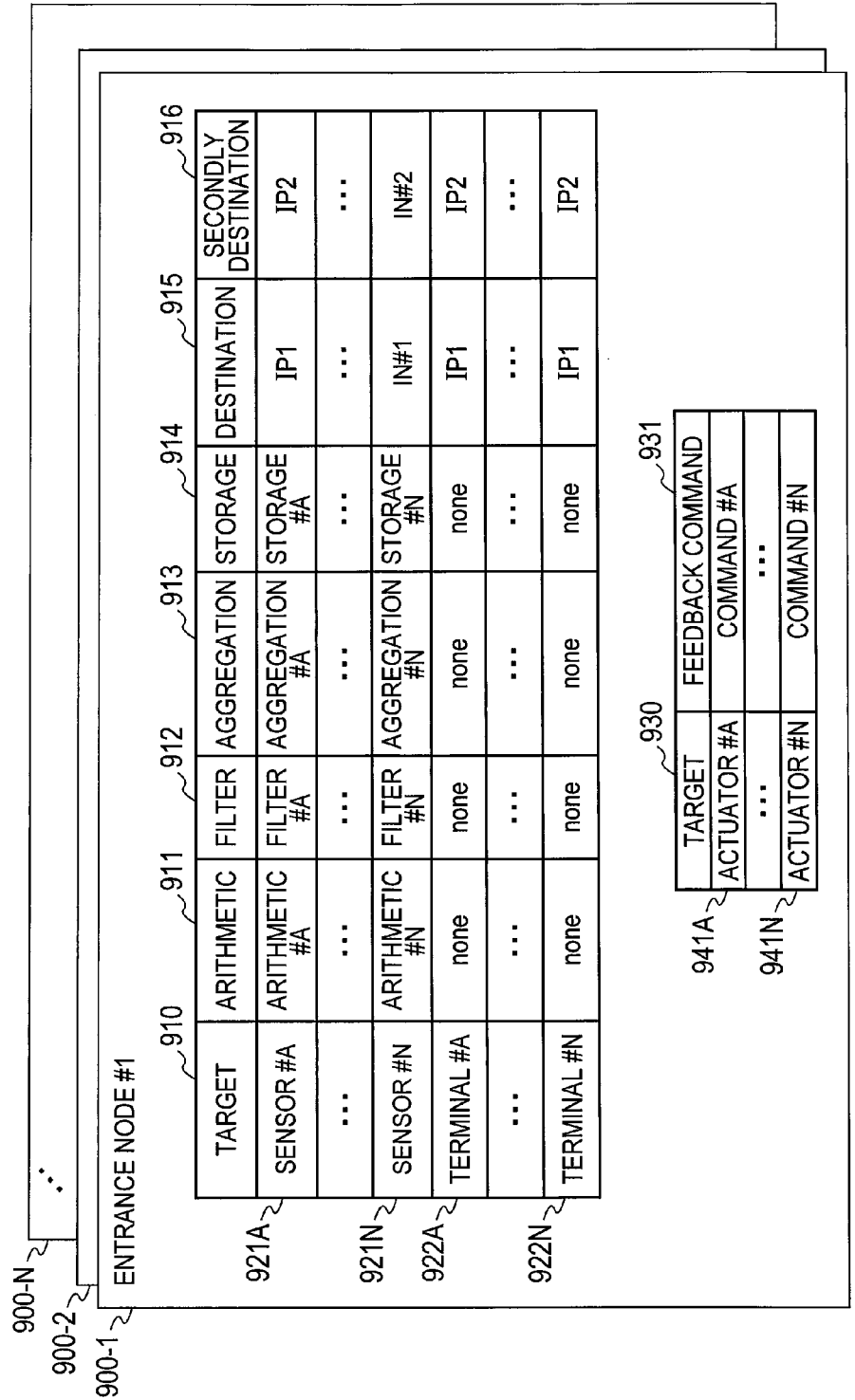
FIG. 9 is a diagram illustrating one example of an EN management table stored in the memory unit of the MN according to the first embodiment.

As one example of each management table 607 stored on the memory unit in the MN 103 of the system of this embodiment, examples of the IN management table and EN management table are illustrated in FIG. 8 and FIG. 9. The EN management tables 900-1 to 900-N illustrated in FIG. 9 corresponds to management tables which each EN 101 of FIG. 12 previously described memorizes, and illustrates that each of the multiple EN 101-1 to EN 101-N stores each EN management table in this system. Data in this management table 900 is delivered to each EN 101 and stores on the memory unit thereof in the step 1708 of FIG. 17.

The content of the EN management table of FIG. 9 is the same as descried in the EN management table 209 of FIG. 12. However, a destination 915 in the table 910 may be the original destination of the aforementioned application, or the MN 103 explicitly designates the destination of the IN 102. A secondly destination 916 represents a destination which is an alternative when the destination 915 cannot be used. Generation and management of this EN management table 900 may not be physically performed in the MN 103 but may be performed, instead of the MN 103, by the server for management 401-4 of the IN 102.

The IN management tables 800-1 to 800-N of FIG. 8 is described. Each of the IN management tables 800-1 to 800-N corresponding to each application designates conditions for specifying the aforementioned users or applications as applicable information 810. For example, conditions such as the above described communication packet distinguished with five-tuple of SIP, DIP, SRORT, DPORT, and PROTOCOL can be designated.

As an example of the conditions in this case, the following conditions can be set.

SIP is the aforementioned user, or in some cases, the EN 101 including the aforementioned user, DIP is the original destination IP1 (DC#1) of the aforementioned application, SPORT is a port number indicating the aforementioned user application, DPORT is a port number indicating the aforementioned application, and PROTOCOL is TPC.

Obviously, further information of the upper layers may be added when these settings are insufficient for the conditions, while a part of the conditions can be deleted when the information is too much. Such information is listed in the applicable information 810 of the IN management table 800.

As nominated information 820 in the IN management table, various pieces of information related to the aforementioned application are defined. In an example of FIG. 8, the nominated information 820 includes a modified destination 821, a destination for succession processing 822, an application for distribution 823, an application apply policy 824, and a table update policy 825. Here, the modified destination 821 indicates which IN 102 the original destination IP1 being the DC is moved to, and selects and lists the target IN in the field of the first candidate.

At this time, a predetermined blade in the IN may be specified, and specific assignation may be entrusted to the server for management 401-4 in the IN without specifying the blade. At this time, the assignation policy is noticed by the application apply policy 824. For example, the assignation policy includes a method in which total of the performance of the CPU is assigned so as to exceed a constant value. The assignation policy also includes a method in which one of the servers having a low operation rate or the multiple servers satisfying the CPU performance and memory capacity required for the aforementioned application are assigned. Other assignation policy includes a method in which priority is determined for every application, and the application having high priority is assigned to one of the servers having a low operation rate or the multiple servers while the application having low priority is assigned to one of the servers having a high operation rate or the multiple servers. If other IN, which is second nominated information or other nominated information having lower priority, is a nominated information, the other IN can be listed. When service level and the like is designated as options, the IN which satisfies the options is listed.

The destination for succession processing 822 is listed in the case that only one IN cannot completes the processing and the processing is performed across the multiple INs. The continuous processing destination 822 is not needed to be set when the subsequent processing is not required.

The application for distribution 823 represents an application program for executing the aforementioned application A on the IN. This program may be executable binary file or may be a source code which the aforementioned IN compiles. The program is not always needed to be a single file, and a plurality of files can be applicable.

The table update policy 825 defines a policy for changing an execution position when information processing delay caused by the use of the aforementioned application exceeds an initial estimation as a result of status monitoring of the IN and the EN, for example, when the server is overloaded and thereby the application execution itself becomes slow. For example, the updated policy includes that, a flow having high priority is continuously assigned to the same server 401 in the IN 102 as much as possible; a flow having moderate priority is reassigned to other server 401 which is a different sever processing the flow having high priority in the IN 102; and a flow having low priority is reassigned to a second nominated IN 102 or DC 106, when the server becomes overloaded.

As described above, the distributed information communication processing system of the first embodiment is described in detail using the face authentication automatic door system as the specific example. Other applicable services are sequentially described in the following embodiments. In the following description, only difference between each embodiment and the first embodiment is described because the basic system configuration, the constituents, the processing flow, and the like are the same as the first embodiment.

Second Embodiment

The second embodiment is an example of a device monitoring system for detecting abnormal value in a factory.

The EN 101 includes sensors 107, a monitoring camera, and further a monitoring terminal device. EN 101 collects temperature information from the sensors 107 at a constant period according to the processing flow of FIG. 13, and collectively notifies the IN 102 of information by the aggregation function and the like whenever a change exceeding a certain level occurs. Monitored image from the monitoring camera being terminals 109 included in EN 101 is buffered by the accumulation function 202, and only required image is notified to the IN 102 with a notice of temperature information. This corresponds to a content of transition, 1301→1302→1303→1304→1305→1306→1307→1308→1309, in the flowchart of FIG. 13.

The IN 102 monitors temperature by notified information from the EN 101, and sends a related image as feedback information to the monitoring terminal included in the EN 101 when an abnormal value is detected. In addition, the IN 102 notifies DC 106 of a log of the monitoring status. When the DC 106 itself is the monitoring terminal device, the image is delivered to the DC 106. This corresponds to a content of transition, 1401→1402→1403→1404→1405→1406→1407→1411→1412→1413→1414, in the flowchart of FIG. 14.

When an image is delivered from the IN 102 to the monitoring terminal device described above, the EN 101 delivers the image to the aforementioned monitoring terminal device. For example, when an abnormal value is detected at the time of monitoring temperature, the EN 101 delivers the image with a format being suitable for the monitoring terminal device. This corresponds to a content of transition, 1301→1302→1303→1310→1320→1330, or 1301→1302→1303→1310→1311→1312, in the flowchart of FIG. 13.

Third Embodiment

The third embodiment is an embodiment of a position management, that is, a security management system.

The EN 101 includes sensors 107 and the actuators 108 such as a door, a buzzer, a light, and the like. The EN 101 collects position information such as a room and a place from the sensors 107, is verified with the past position information by using the calculation function, the filter function, and the aggregation function, and notifies the IN 102 of an Identifier (ID) and the position information of the moved target. This corresponds to a content of transition, 1301→1302→1303→1304→1305→1306→1307→1308→1309, in the flowchart of FIG. 13. After a feedback notice arrives to the control targets such as the actuators 108, the EN 101 generates a processing command of these actuator control devices and actuates the actuators 108. This corresponds to a content of transition, 1301→1302→1303→1310→1311→1312, in the flowchart of FIG. 13.

On the other hand, the IN 102 retains a security information DB, verifies the position information of the target notified from the EN 101 with the retained security information DB, generates feedback information depending on whether the target has authority or not, and notifies the control targets such as the actuators 108 of the feedback information through the EN 101. In addition, the IN 102 notifies the DC 106 of the position information of the target. This corresponds to a content of transition, 1401→1402→1403→1404→1405→1406→1407→1411→1412→1413→1414, in the flowchart of FIG. 14. The notice to the control targets includes opening the door for a target having the authority, lighting a light and sounding an alarm such as the buzzer when a target not having the authority enters into a certain zone, notifying to a security center, and the like. In this case, a target destination of the notice includes the security center.

In the DC 106, the position information of the target notified from the IN 102 is collected as a log. This corresponds to a content of transition, 1501→1502→1503→1504→1560, in the flowchart of FIG. 15. Further, the DC 106 provides guards with monitored information of all positions in a management region by the position management application and stores the provided information. This corresponds to a content of transition, 1501→1502→1503→1504→1505→1506→1509→1510→1511, in the flowchart of FIG. 15.

Fourth Embodiment

The fourth embodiment is an embodiment of a self-inspection/facility monitoring system for abnormal situation.

In this embodiment, the EN 101 collects sensor information from the sensors 107 such as acceleration sensors, vibration sensors, and pressure sensors, computes by the calculation function such as Fast Fourier Transform (TFF) to separate effective quake data and ineffective quake data, and discards the ineffective data and notifies the IN 102 of the effective data. This corresponds to a content of transition, 1301→1302→1303→1304→1305→1306→1307→1308→1309, in the flowchart of FIG. 13.

The IN 102 analyzes the effective data notified from the multiple ENs 101 in detail, and notifies the registered destination included in the EN 101 and the DC 106 of alarms such as prompt announcement of earthquake or prompt announcement of abnormal situation at a specified place in the giant facility when the IN 102 detects data indicating requirement of emergency response. In addition, the IN 102 notifies the DC 106 of the effective data. This corresponds to a content of transition, 1401→1402→1403→1404→1405→1406→1407→1411→1412→1413→1414, in the flowchart of FIG. 14. When an alarm notice is sent from the IN 102, the EN 101 including an alarm delivery target as the registered destination delivers the alarm notice by generating a format suitable for the alarm delivery target. This corresponds to a content of transition, 1301→1302→1303→1310→1311→1312, in the flowchart of FIG. 13.

The DC 106 stores the alarm information and the effective data notified from the IN 102. This corresponds to a content of transition, 1501→1502→1503→1504→1560, in the flowchart of FIG. 15. Also, the DC 106 performs detailed analysis, if needed, and preforms generation of prediction information of the place where an abnormal situation will occur. In addition, the DC 106 stores the generated prediction information. This corresponds to a content of transition, 1501→1502→1503→1504→1505→1506→1509→1510→1511, in the flowchart of FIG. 15.

Fifth Embodiment

Subsequently, the fifth embodiment relates to a monitoring system and is a model in which the EN retains sensor information and the like and the DC collects only required the information when needed.

In this system, the EN 101 collects one or more pieces of sensor information and camera images in a base from the included sensors 107 and the terminals 109. Examples of the sensor information include temperature, vibration, a volume of water, and a volume of sound. A threshold value is set to these sensors. When the sensor value is lower than the threshold value, the EN discards the sensor information and the camera image, while the sensor value is beyond the threshold value, the EN 101 generates event information meaning the generated event and sends to the IN 102. At this time, the sensor information and the camera image themselves are retained in the EN 101. When a transfer of these pieces of stored information is requested from the IN 102 and DC 106, the EN 101 transfers the requested data to the aforementioned destination of the requestor. This corresponds to a content of transition, 1301→1302→1303→1310→1320→1321, in the flowchart of FIG. 13.

The IN 102 collects the event information from the multiple ENs 101, aggregates the notified event information of the same category from the same category such as temperature change, and sends to the DC 106. This corresponds to a content of transition, 1401→1402→1403→1404→1405→1406→1407→1411→1412→1413, in the flowchart of FIG. 14.

In this embodiment, the DC 106 acts as a monitoring center, obtains the sensor information or image information which is required for application execution from the EN based on the event information, and processes. The processing result is stored as a log. This corresponds to a content of transition, 1501→1502→1503→1504→1505→1506→1509→1510→1511, in the flowchart of FIG. 15. In this case, a feedback result is determined as a monitor in the DC 106 being a monitoring center and the like.

The distributed information communication processing system of this embodiment described above in detail dynamically manages a position where the MN should process the information. The EN and the IN are located sufficiently near the information source compared with the DC. Useless information is filtered near the information source by the EN, and the IN located near the information source to which application execution is assigned by the MN executes the information instead of the DC. By this processing method, the communication delay which has traditionally taken 100 ms in the case between a foreign country and Japan can be suppressed to the order of several milliseconds. Consequently, according to the system of this embodiment, real time type information processing having response speed of the order of ten-millisecond can be realized, which cannot be realized by conventional systems. Further, electric power consumption for transmission previously generated can be reduced in proportion to a reduced amount of unnecessary information deletion in the EN.

As described above, various embodiment of the present invention are described form the viewpoint of the serial distributed information communication processing system which is realized by collaboratively using the EN 101 and the IN 102 being serially connected. However, the distributed information communication processing system of the present invention is not limited to the above-described embodiments of the serial distributed information processing, and the system is effective from the viewpoint of multiple use of the parallelly located INs 102. The method as described above is a method in which the information processing position which should be executed by the specific parameter such as position information is distributed to the multiple INs 102, which are previously processed by the DC 106 in overconcentration. Here, an example of an application method for an electronic advertising display using a cellular phone display is described. When an electronic advertising display system is managed for all cellular phones in Japan (about one hundred million phones) as a target, problems of a bottleneck of processing and communication costs arise, because the process is concentrated to the DC in conventional system. On the other hand, in the distributed information communication processing system of these embodiments, the conventional problems are solved in a manner that the EN and the IN are located in every area, and each EN and IN perform processes only persons and the cellular phones who and which approach to the specific shops as targets.

Although it is described that the EN 101 and the IN 102 are separated in any embodiments, a function of the EN 101 may be included in IN 102 as one function thereof.

In the distributed information communication processing system like these embodiments, when a plurality of information communication devices provide services through a network, the devices can provide real time services to each information communication device.

LIST OF REFERENCE SIGNS

101 Entrance node (EN)
102 Intelligent node (IN)
103 Management node (MN)
104, 105 Network
106 Data center (DC)
107 Sensors
108 Actuators
109 Terminals
201, 208 Network communication function
202 Accumulation function
203 Calculation function
204 Filter function
205 Aggregation function
206 Management function
207 Transmission data select function
209, 900 EN management table
301, 601 Processor
302, 602 Internal bus
303, 405, 603 Network interface
304, 604 Memory
305, 605 Storage
306, 606 Input/output unit (I/O)
401 Server
402, 510 Port for management
403 Switch
404 Communication control unit
501 Network interface aggregator
502 Packet analyze unit
503 Flow detect unit
504 Destination decision unit
505 Network interface output unit
506 Table update unit
507 Flow table
508 Flow status table
509 Routing table
607 MN management table
701 Proxy server
702 Communication path
703 Server
704 Storage
705 Processor
706 Internal bus
707 Network interface
708 Memory
709 Storage
710 Input/output unit (I/O)
800 IN management table

The invention claimed is:

1. An information communication processing system comprising:
  an information processing device configured to execute an application;
  a plurality of terminals requesting services;
  a first network node connected to the terminals;
  a second network node connected to the first network node through a first network and connected to the information processing device through a second network; and
  a management node for managing the first network node and the second network node,
  wherein:
  the first network node is configured to send a packet having the information processing device as a destination through the second network node;
  the second network node is configured to analyze the packet which is received from the first network node; and
  the information processing device is configured to execute the application when the packet is received through the second network node, and
  the second network node is further configured to:
  change the destination of the packet to a processor of the second network node when the processor of the second network node is able to perform processes associated with the analysis result, the packet, and the application, and
  send a packet including a result processed by the processor of the second network node back to the first network node.

2. The information communication processing system of claim 1,
  the first network node further comprising:
  an interface configured to send and receive a packet; and
  a processing unit configured to process the packet received by the interface,
  wherein:
  the processing unit is configured to perform calculation processing, filtering, or aggregation processing to the packet received from the terminals, select the processed result, and send the selected result; and
  the management node comprises a management table adapted to store contents of the calculation processing, the filtering, or the aggregation processing of the first node, and send the contents of the management table to the first network node.

3. The information communication processing system of claim 2,
  wherein the processing unit of the first network node is adapted to generate a processing command based on the packet received from the second network node, and send the processing command to the terminals, or send data stored in the first network node through the interface when the received packet is a stored data request.

4. The information communication processing system of claim 1,
the second network node further comprising:
a plurality of processors executing at least one application; and
a communication control unit configured to transfer the received packet to at least one of the destinations among the processors of the second network node and external nodes other than the second network node, and
wherein the management node comprises a management table adapted to store nominated information for changing an execution target of the at least one application or the processing associated with the application which is executed by the processors of the second network node, and send contents of the management table to the second network node.

5. The information communication processing system of claim 4, wherein,
the communication control unit is configured to associate the packets which correspond with at least a part of a header and a payload to the same flow according to a predetermined rule, and comprise a table indicating a destination of the flow, and change a destination of the packets to the destination of the associated flow according to the table, and
the communication control unit is configured to rewrite the destination in the table, based on load information of the processors.

6. The information communication processing system of claim 5,
wherein:
the management node is configured to generate a request for replicating the at least one application performed in the information processing device or a request for rewriting the destination in the table to the second network node, and send the request to the second network node, and
the second network node is configured to replicate the at least one application or processing associated with the at least one application in the processor or rewrite the destination in the table based on the rewriting request according to the request from the management node.

7. An information communication processing method for providing a service to a plurality of terminals, the method comprising the steps of:
connecting a first network node connected to at least one terminal to a second network node through a first network;
connecting the second network node to an information processing device through a second network; and
for providing the service to the terminals:
sending a packet having the information processing device as a destination to the first network by using information obtained from the terminal in the first network node;
analyzing the packet received from the first network node by the second network node;
changing the destination of the packet to an information processing function unit of the second network node when the second network node receives the packet from the first network and when the information processing function unit of the second network node is able to perform processes associated with the analyzed result, the packet, and the application;
sending a packet including a result processed by the information processing function unit to the first network node by the second network node; and
receiving the packet including the result by the first network node to provide the service to the terminal.

8. The information communication processing method of claim 7,
wherein:
the terminals comprise a monitoring camera and an automatic door,
the first network node is configured to extract a face by the monitoring camera and send extracted face image data to the second network node, and
the second network node is configured to send a control signal for opening the automatic door to the first network node when the face image data corresponds to a face image in a database.

9. The information communication processing method of claim 7,
wherein:
the terminals comprise a sensor and a monitoring camera,
the first network node is configured to send an output of the sensor and image data of the monitoring camera to the second network node when the sensor output of the sensor exceeds a set threshold value, and
the second network node is configured to send the image data to a previously registered user when the second network node detects an abnormal value from the sensor output.

10. The information communication processing method of claim 7,
wherein:
the terminals comprise an acceleration sensor or a vibration sensor,
the first network node is configured to separate effective quake data and ineffective quake data based on an output of the acceleration sensor or the vibration sensor, and send the separated effective quake data to the second network node, and
the second network node is configured to generate an alarm notification based on the received effective quake data, and send the generated alarm notification to a previously registered user.

11. The information communication processing method of claim 7,
wherein:
the terminals comprise a sensor and a camera,
the first network node is configured to store a sensor output of the sensor and image data of the camera, generate corresponding event information when the output of the sensor exceeds a set threshold value, and send the event information to the second network node, and
the second network node is configured to send a transfer request of the necessary sensor output and the necessary image data to the first network node based on the event information.

12. A network node sending and receiving a packet through a first network connected to a first network node to which a plurality of terminals are connected and a second network connected to an information processing device, the network node comprising:
a network interface unit connected to the first network and the second network;

a communication control unit analyzing the packet received through the network interface unit and the packet having the information processing device as a destination; and an information processing function unit to which the destination of the packet is changed and to which the packet received through the network interface unit is transferred by the communication control unit and which is configured to execute a predetermined application for the packet when the information processing function unit of the second network node is able to perform processes associated with the analyzed result, the packet, and the application.

13. The network node according to claim 12, wherein, by using a table configured to record a connection status and a destination of the packet, the communication control unit is adapted to change the destination of the packet based on destinations in the table, and wherein, the information processing function unit comprises a plurality of processors, and the communication control unit is configured to change a destination of the packet to one of the processors.

14. The network node according to claim 13, wherein the communication control unit is configured to rewrite the destination of the flow based on load information of the information processing function unit, rewrite the destination of the flow, the connection status of which is an unconnected status, based on a request from the management node, or rewrite the destination of the flow to the information processing function unit.

* * * * *